United States Patent
Kurtze et al.

(10) Patent No.: US 6,198,477 B1
(45) Date of Patent: Mar. 6, 2001

(54) MULTISTREAM SWITCH-BASED VIDEO EDITING ARCHITECTURE

(75) Inventors: Jeffrey D. Kurtze, Hudson, NH (US); Joseph H. Rice, Acton; Robert Gonsalves, Wellesley, both of MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/054,764

(22) Filed: Apr. 3, 1998

(51) Int. Cl.[7] .................................................. G06T 13/00
(52) U.S. Cl. ............................................................. 345/302
(58) Field of Search .................................. 345/473, 328, 345/474, 302; 358/357, 540

(56) References Cited

U.S. PATENT DOCUMENTS

| | | | |
|---|---|---|---|
| 4,080,626 | 3/1978 | Hurst et al. | 358/160 |
| 4,694,343 | 9/1987 | Flora | 358/183 |
| 5,508,940 | 4/1996 | Rossmere et al. | 364/514 |
| 5,644,364 | 7/1997 | Kurtze et al. | |
| 5,684,543 | 11/1997 | Kobayashi | 348/705 |
| 5,706,290 | * 1/1998 | Shaw et al. | 345/328 |
| 5,821,945 | * 10/1998 | Yeo et al. | 345/440 |
| 5,996,008 | * 11/1999 | Gardos et al. | 345/328 |
| 6,026,389 | * 2/2000 | Nakajima et al. | 345/328 |

FOREIGN PATENT DOCUMENTS

| | | | |
|---|---|---|---|
| 42 01 335 A1 | 7/1993 | (DE) . | |
| 0 336 712 A2 | 10/1989 | (EP) | H04N/5/265 |
| 0 450 471 A2 | 10/1991 | (EP) | G11B/27/031 |
| 0 488 673 A2 | 6/1992 | (EP) | H04H/7/00 |
| 0 715 460 A1 | 6/1996 | (EP) | H04N/5/91 |
| WO 94/24815 | 10/1994 | (WO) . | |
| WO 97/41684 | 11/1997 | (WO) . | |
| WO 98/59494 | 12/1998 | (WO) . | |

OTHER PUBLICATIONS

The Brughetti Corporation, 1994, product information and diagrams for PURE Image Creator, SLICE Transition Maker, and AIR Playout Manager.

* cited by examiner

Primary Examiner—Mark Zimmerman
Assistant Examiner—Huedung X. Cao
(74) Attorney, Agent, or Firm—Wolf, Greenfield & Sacks, P.C.

(57) ABSTRACT

An architecture for performing real-time image processing on multiple image data streams using compressed or uncompressed image data includes a switch for forwarding data from multiple input sources to multiple destinations on a video processing device. The video processing device includes two independent processing pipelines for processing two different data streams. The switch may couple one or both input data stream to be multiple different destinations. Multiple video processing devices may be coupled via the switch to increase the number of data streams capable of being processed at any given time. Mixers are coupled in a cascaded fashion using the switch, thereby providing selective keying capability and allowing for multiple keying events to be entered during one phase of processing. Each of the processing pipelines on the video processing device includes dedicated processing logic, compression logic and frame buffer storage. Logic is provided with each frame buffer to support motion effects. By providing two distinct processing pipelines, greater control may be achieved for production of an output image. The architecture may be easily augmented to include a datapath for processing uncompressed image data. Data management techniques allow uncompressed image data to be processed in real time. A simple mechanism is provided to enable switching between processing using compressed data and uncompressed data at any point in the video production process.

35 Claims, 32 Drawing Sheets

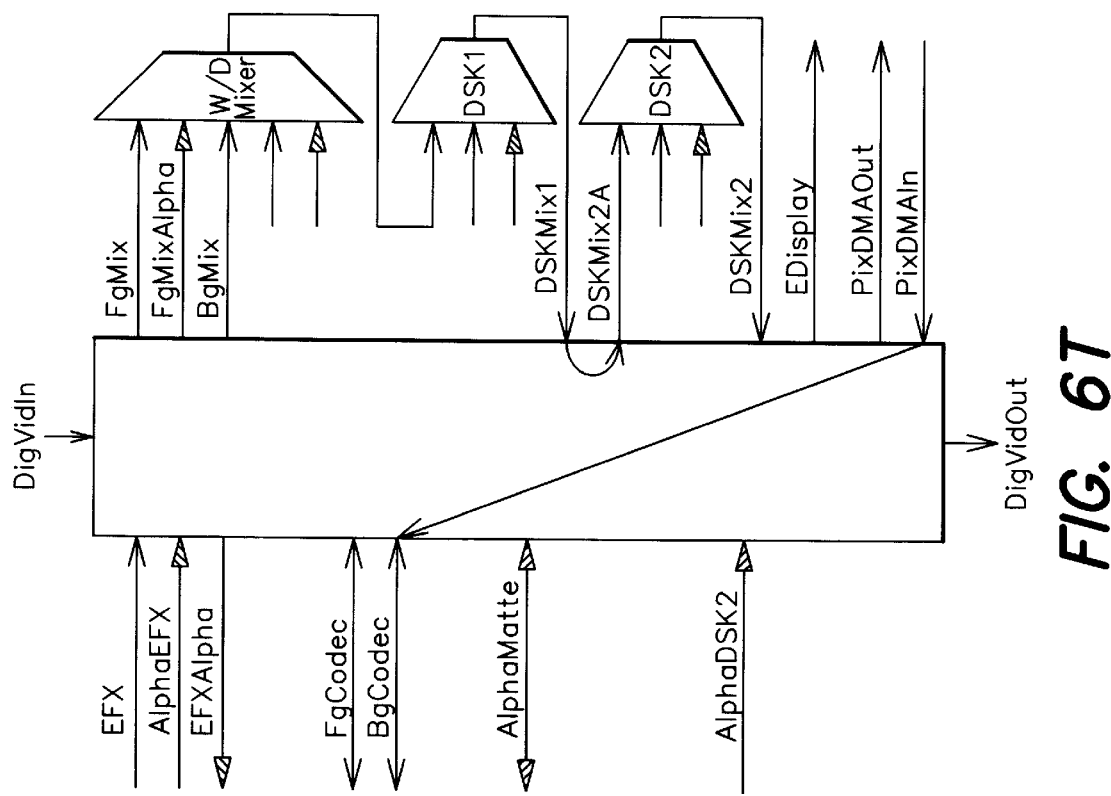
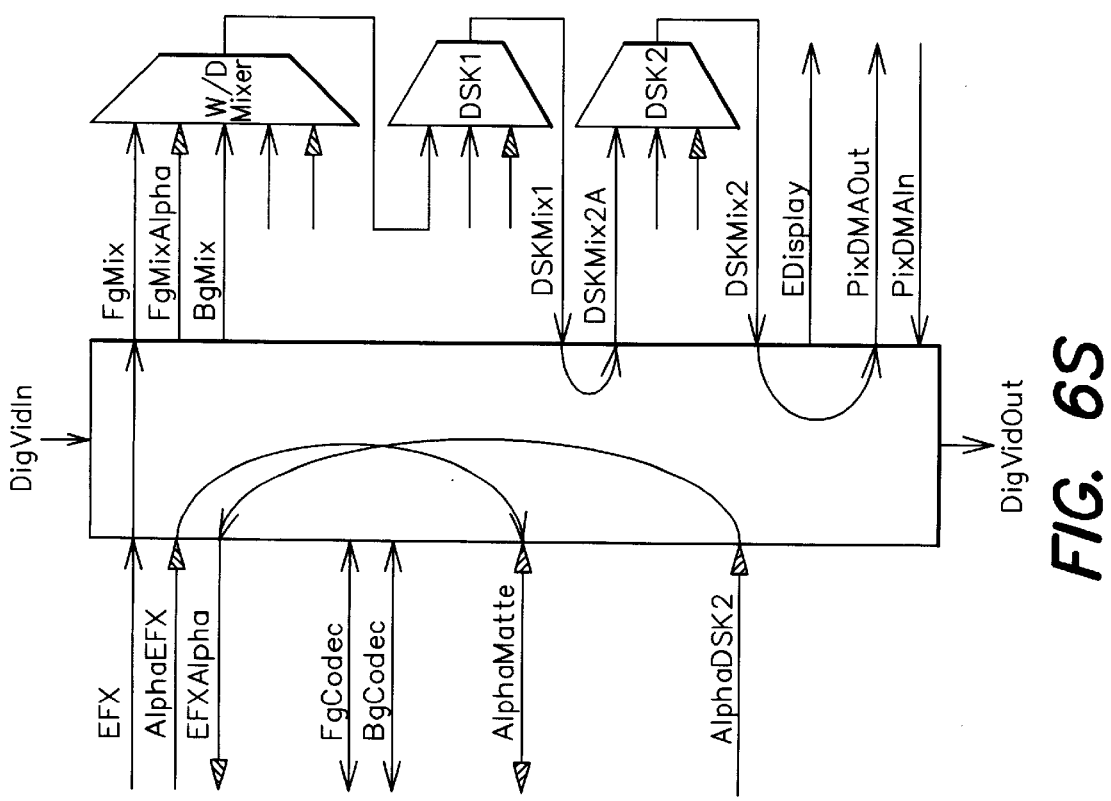
FIG. 6T
FIG. 6S

Standard Bit Ordering for Raster mode:

| 16 | 15 | 14 | 13 | 12 | 11 | 10 | 9 | 8 | 7 | 6 | 5 | 4 | 3 | 2 | 1 | 0 |
|----|----|----|----|----|----|----|---|---|---|---|---|---|---|---|---|---|
| Y (6:3) | | | | Y (2:0) | | | X (9:7) | | | X (6:4) | | | X (3:2) | | C(1:0) | |
| <---Y(6:0)---> | | | | | | | <-----X(9:2)-----> | | | | | | | | comp | |

FIG. 8A

Standard Bit Ordering for Block format:

| 16 | 15 | 14 | 13 | 12 | 11 | 10 | 9 | 8 | 7 | 6 | 5 | 4 | 3 | 2 | 1 | 0 |
|----|----|----|----|----|----|----|---|---|---|---|---|---|---|---|---|---|
| ST (3:0) | | | | MN (5:3) | | | MN (2:0) | | | MI (5:3) | | | MI (2:1) | | C(1:0) | |
| strip# | | | | <--MCU#--> | | | | | | line in MCU | | | px MCU | | comp | |

FIG. 8B

|  | T0 | T1 | T2 | T3 | T4 | T5 | T6 | T7 | T8 | T9 |
|---|---|---|---|---|---|---|---|---|---|---|
| Fields In | O1 | E1 | O2 | E2 |  |  |  |  | O3 | E3 |
| Fields Out |  | O1 | E1 | O2 | E2 | O2 | E2 | O2 | E2 | O3 | E3 |
| HC |  |  |  | 1 |  | 0 |  |  |  |  |

FIG. 12A

|  | T0 | T1 | T2 | T3 | T4 | T5 | T6 | T7 |
|---|---|---|---|---|---|---|---|---|
| Fields In | O1 | E1 | O2 | E2 |  |  | O3 | E3 |
| Fields Out |  | O1 | E1 | O2 | O2 | O2 | O2 | O3 | E3 |
| HC |  |  | 1 |  | 0 |  |  |  |
| SS |  |  |  | 1 |  |  | 0 |  |

FIG. 12B

|  | T0 | T1 | T2 | T3 | T4 | T5 | T6 | T7 | T8 | T9 |
|---|---|---|---|---|---|---|---|---|---|---|
| Frames In | F1 | F2 |  |  |  |  |  | F3 |  |  |
| Fields Out |  | O1 | E1 | O2 | E2 | O2 | E2 | O2 | E2 | O3 | E3 |
| HC |  |  |  |  |  |  |  | 0 |  |  |

FIG. 12C

| | T0 | T1 | T2 | T3 | T4 | T5 | T6 | T7 | |
|---|---|---|---|---|---|---|---|---|---|
| Frames In | F1 | | F2 | | | | F3 | | 300 |
| Fields Out | O1 | E1 | O2 | O2 | O2 | O2 | O3 | E3 | 310 |
| HC | | | 1 | | 0 | | | | |
| SS | | | | 1 | | | | 0 | |

FIG. 12D

2:3 Pulldown:

| | T0 | T1 | T2 | T3 | T4 | T5 | T6 | T7 | T8 | T9 | T10 | T11 |
|---|---|---|---|---|---|---|---|---|---|---|---|---|
| Frames In | A | | B | | | C | | D | | | A | |
| Fields Out | Ao | Ac | Bo | Bc | Bo | Cc | Co | Dc | Do | Dc | Ao | |
| HC | | | 1 | 0 | | | 1 | 0 | | | | |
| SW | | | 1 | | | | 0 | | | | | |

FIG. 12E

3:2 Pulldown:

| | T0 | T1 | T2 | T3 | T4 | T5 | T6 | T7 | T8 | T9 | T10 | T11 |
|---|---|---|---|---|---|---|---|---|---|---|---|---|
| Frames In | A | | | B | | C | | | D | | A | |
| Fields Out | Ao | Ac | Ao | Bc | Bo | Cc | Co | Cc | Do | Dc | Ao | |
| HC | 1 | 0 | | | 1 | 0 | | | | | | |
| SW | 1 | | | | 0 | | | | | | | |

FIG. 12F

|  | T0 | T1 | T2 | T3 | T4 | T5 | T6 | T7 | T8 | T9 | T10 | T11 |
|---|---|---|---|---|---|---|---|---|---|---|---|---|
| Frames In | A |  |  |  |  | B |  |  |  |  | C |  |
| Fields Out |  | Ao | Ac | Ao | Ac | Ao | Bc | Bo | Bc | Bo | Bc | Co |
| HC |  | 1 |  |  | 0 | 1 |  |  |  | 0 | 1 |  |
| SW |  | 1 |  |  |  | 0 |  |  |  |  | 0 |  |

FIG. 12G

|  | T0 | T1 | T2 | T3 | T4 | T5 | T6 | T7 | T8 | T9 | T10 | T11 |
|---|---|---|---|---|---|---|---|---|---|---|---|---|
| Frames In | A |  |  |  |  |  |  | B |  |  |  |  |
| Fields Out |  | Ao | Ac | Ao | Ac | Ao | Ac | Ao | Bc | Bo | Bc |  |
| HC |  | 1 |  |  |  |  | 0 | 1 |  |  |  |  |
| SW |  | 1 |  |  |  |  |  | 0 |  |  |  |  |

FIG. 12H

MULTISTREAM SWITCH-BASED VIDEO EDITING ARCHITECTURE

FIELD OF THE INVENTION

The present invention is related to digital image editing and production systems.

BACKGROUND OF THE INVENTION

Technology for manipulating digital video has progressed to a point where it can be readily processed and handled on computers. Video production systems have been provided wherein digital video can be readily captured, edited, and displayed for various purposes, such as broadcast television and film and video program post-production.

Typical production systems typically operate in a composition mode, for creating production material, adding special effects and the like. When it is desired to view the results of the composition, the production systems switch to a display mode, where portions of the edited product are displayed for viewing. When generating a composition, the user typically switches between these modes of operation to monitor the quality of decisions made during composition.

One example of such a video production system is described in PCT patent application WO 94/24815, filed Apr. 16, 1993 and entitled "Media Pipeline with Multichannel Video Processing and Playback", incorporated herein by reference. In this system, two streams of video data are independently compressed or decompressed and the results are blended to form a composite image. Processing and keying is performed on the blended data stream.

One advantage of the above system is that it allows different resolutions and compression amounts to be applied to the two data streams. However, the positioning of the blender limited the amount of keying events that could be added to the production on any given pass through the pipeline. In addition, because only two stream of data were processed, often the generation of composite images, which result from a blending of multiple streams of data, required multiple passes through the pipeline.

SUMMARY OF THE INVENTION

An architecture for performing real-time image processing on multiple image data streams using compressed or uncompressed image data includes a switch for forwarding data from multiple input sources to multiple destinations on a video processing device. The video processing device includes two independent processing pipelines for processing two data streams. The switch may couple one input data stream to be multiple destinations. As a result, multiple tasks, such as record and play, may be performed on the data stream simultaneously. Alternatively, the switch allows two different input data streams to be forwarded to two different destinations, for example, two different inputs to a mixing device.

A number of channel devices provide intermediary storage of pixel, matte, alpha, and down stream keying information from or to the host. Two down stream keying channels feed associated mixers. The mixers are coupled in a cascaded fashion using the switch, thereby providing selective keying capability and allowing for multiple keying events to be entered during one phase of processing. In addition, the two down stream keying channels are used to store portions of title images to provide smooth rolling and crawling of titles.

Each of the processing pipelines on the video processing device includes dedicated adjustment logic, compression logic and frame buffer storage. Logic is provided with each frame buffer to support motion effects. By providing two distinct processing pipelines, greater control may be achieved for production of an output image.

The video processing devices may be cascaded using the switch, with the results of the processing of two data streams by the two processing pipelines of a first video processing device being forwarded as an input video source to the second processing device. A third data stream may then be combined with the first two data streams. Additional data streams may be processed by cascading additional video processing devices. In addition, each video processing device may be coupled to special effects processors. Thus, cascading video processing devices allows for an increased amount of special effects to be applied to data streams in any given pass through the video processing pipeline.

In one aspect, a system for processing sequences of digital still images to provide real-time digital video effects includes at least one configurable switch coupling a plurality of sources to a plurality of destinations, where a mode of configuration of the at least one configurable switch controls a direction of flow of the sequences of digital still images from at least one of the plurality of sources to at least one of the plurality of destinations.

In another aspect, a system for processing compressed and uncompressed sequences of still images includes at least one processing datapath capable of operating in compressed and uncompressed mode and select logic, coupled to the at least one processing datapath, for selectively transferring either compressed or uncompressed sequences of digital still images between respective compressed and uncompressed sources and the at least one processing datapath.

In another aspect, a video processing device for providing video processing capability to a host computer includes at least one configurable switch to couple a plurality of sources to a plurality of destinations. A first processing datapath couples a first one of the sources and the at least one configurable switch, where the first processing datapath transfers sequences of digital still images to the configurable switch. A second processing datapath couples a second one of the sources and the at least one configurable switch, where the second processing datapath transfers sequences of digital still images to the configurable switch. A bus couples the video processing device to the host computer, and at least one channel is coupled to the bus and to the at least one configurable switch, for transferring data between the host computer and the video processing device.

BRIEF DESCRIPTION OF THE DRAWINGS

In the drawings,

FIGS. 8A and 8B illustrate address translations for accessing image data in either block or raster format in the video processing device of FIG. 3;

FIGS. 12A–12H are timing diagrams illustrating how mode bits may be used in conjunction with the frame buffer memory of FIG. 10 to provide motion effects for the video processing device of FIG. 3;

DETAILED DESCRIPTION

Figure 1:
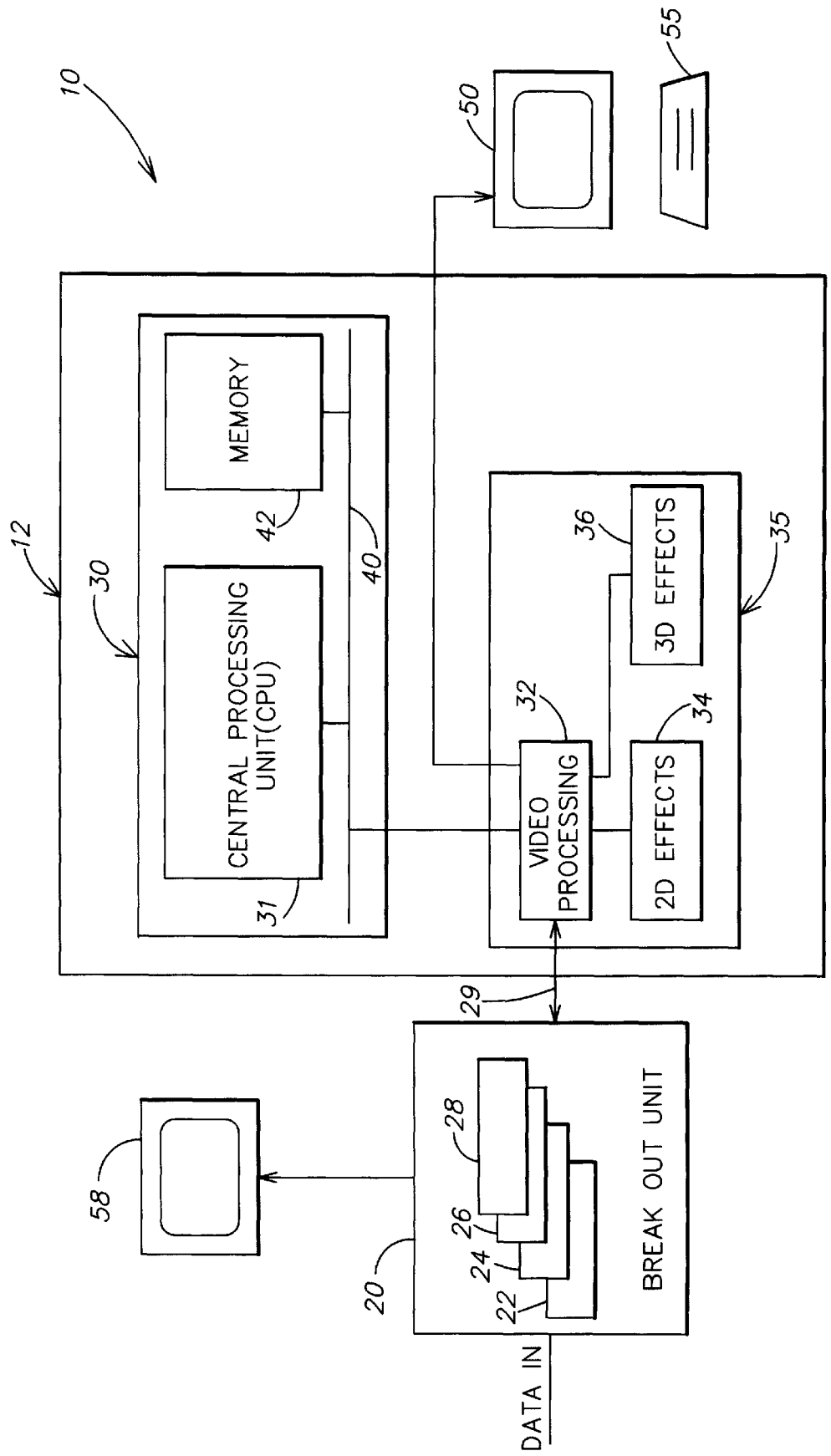
FIG. 1 is a diagram of one embodiment of a video production system incorporating a video processing device.

Referring now to FIG. 1, one embodiment of a video production system 10 includes a host workstation 12 coupled to a break out unit 20. Analog video and audio signals are captured by the break out unit 20 from cameras, video/audio recorders and the like, and digitized in the break out unit 20. The break out unit 20 includes a number of boards 22–28 for performing analog to digital conversion to input video and audio input signals. For example, the boards may be used to translate Composite video, S-Video, Component video and Serial Digital Video. Digitized video data is transferred on line 29 to the host workstation 12. The break out unit 20 is advantageously provided in a cabinet separate from the host workstation 12 in order to isolate the analog to digital conversion of the data from the noise of the host. In one embodiment, communication between the break out unit 20 and the host workstation 30 is provided by a digital cable. Adjustments to the communication signals are controlled using an I$^2$C serial interface.

Coupled to the break out unit 20 is a client monitor 58 that may be used to display a recorded image. In addition, an edit desktop 50 is also coupled to the video processing system 35 of the video production system 10 for displaying an image during editing. The host workstation 12 includes a host computer 30 and a video processing system 35. The host computer 30 is any type of general purpose personal computer such as the Sun Sparcstation or the PowerMac provided by Apple. The host computer 30 includes a Central Processing Unit (CPU) 30 and storage 42 coupled by an interconnect bus 40. In one embodiment, the interconnect bus 40 operates according to a Peripheral Computer Interconnect (PCI) protocol, although this is not a limitation of the present invention. The storage 42 may be a disk device that is used to store software applications and data accessed by the CPU.

The video processing system 35 is coupled to the bus 40 of the host computer. The video processing system 35 includes a main video processing device 32 and optional two-dimensional (2D) effects and three-dimensional (3D) interface devices 34 and 36. The main video processing device 32 includes hardware for controlling video and audio capture, editing and playback. The two-dimensional device may be, for example, a 2D DVE module designed and manufactured by Avid Technology, Tewksbury, Mass. The three-dimensional interface device may be an interface to the GENIE 3D device by Pinnacle Systems, Mountain View, Calif.

As will be described in more detail with regard to FIG. 3, the video processing device 32 incorporates an architecture that allows for simultaneous play, process and record of multiple streams of video data. A video processing device includes two separate play and record data paths. In addition, because composite video is usually formed from more than just two streams of data, the architecture of the video processing device 32 allows multiple video processing devices to be cascaded to support the play and record of multiple data streams and to provide increased special effects capabilities.

Figure 2:
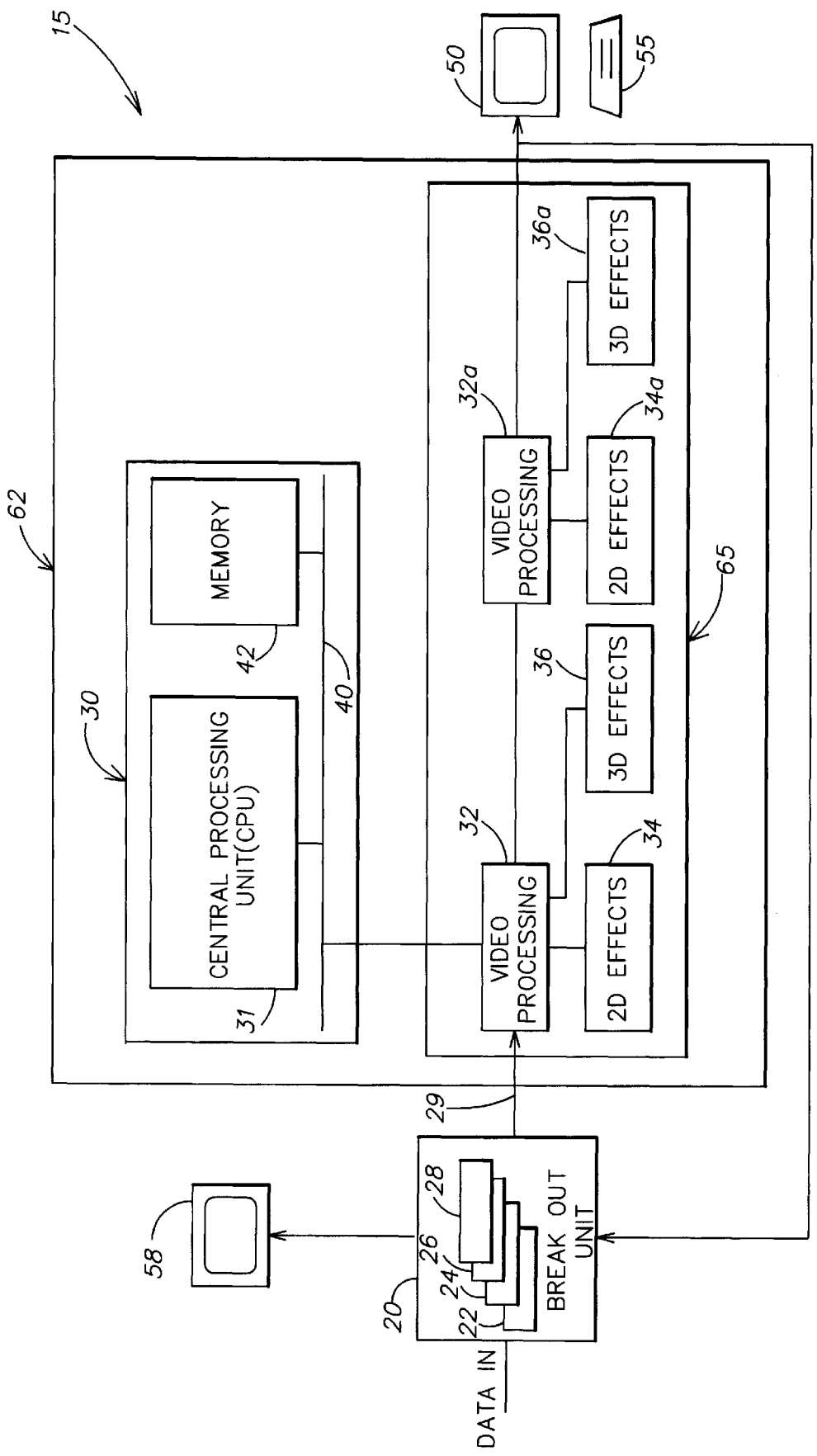
FIG. 2 is a block diagram of a second embodiment of a video production system incorporating cascaded video processing devices.

An embodiment of such a system 15 is illustrated in FIG. 2. The video processing system 65 includes two video processing devices 32 and 32a. Optionally coupled to each of the video processing devices 32 and 32a are respective 2D effects devices 34 and 34a and respective 3D effects devices 36 and 36a. With such an arrangement, two data streams may be blended in one video processing device, with the blended output forwarded to the second video processing device in the cascade. A number of different functions may then be performed on the blended stream in the second video processing device. For example, the blended results may have a special effect applied, may be blended with a third data stream, may be written back to memory, may have more keys applied, etc. The resulting video data stream may be forwarded from the second video processing device 32a to the edit desktop 50 and/or to the client monitor via the break out unit 20. Although the embodiment of FIG. 2 shows the edit desktop 50 coupled to the output of video processing device 32a, the edit desktop may be coupled to any one of the video processing devices in the cascade. Alternatively, there may be more than one edit desktop provided, one for each of the video processing devices in the cascade.

The architecture of the video processing devices thus provides the flexibility to allow additional video processing cards to be added depending upon desired data stream and special effects processing capabilities. One embodiment of the video processing architecture is shown in FIG. 3.

Figure 3A:
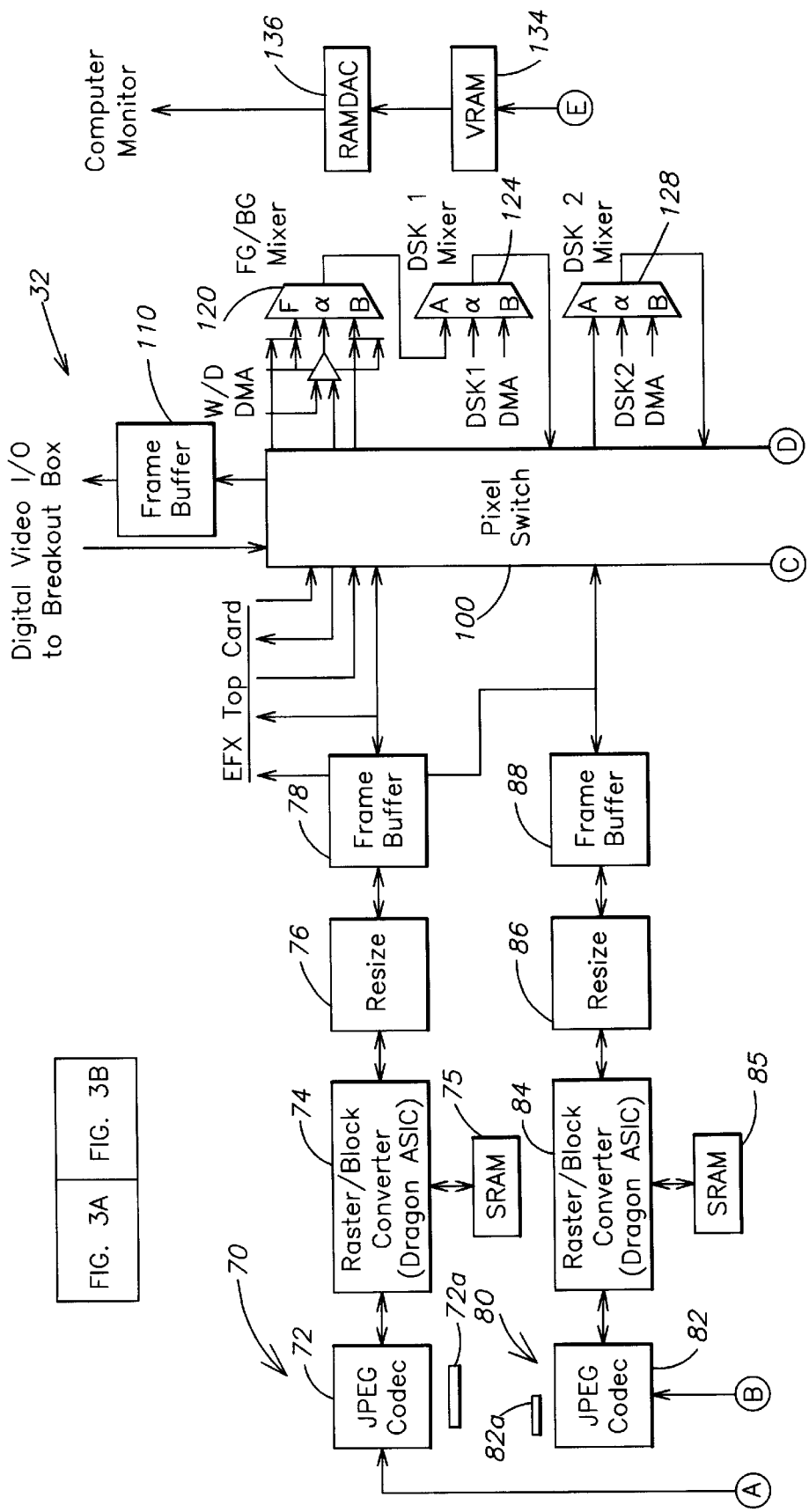
FIG. 3 is a block diagram of a video processing device for use in the video production systems of FIG. 1 or 2.
Figure 3B:
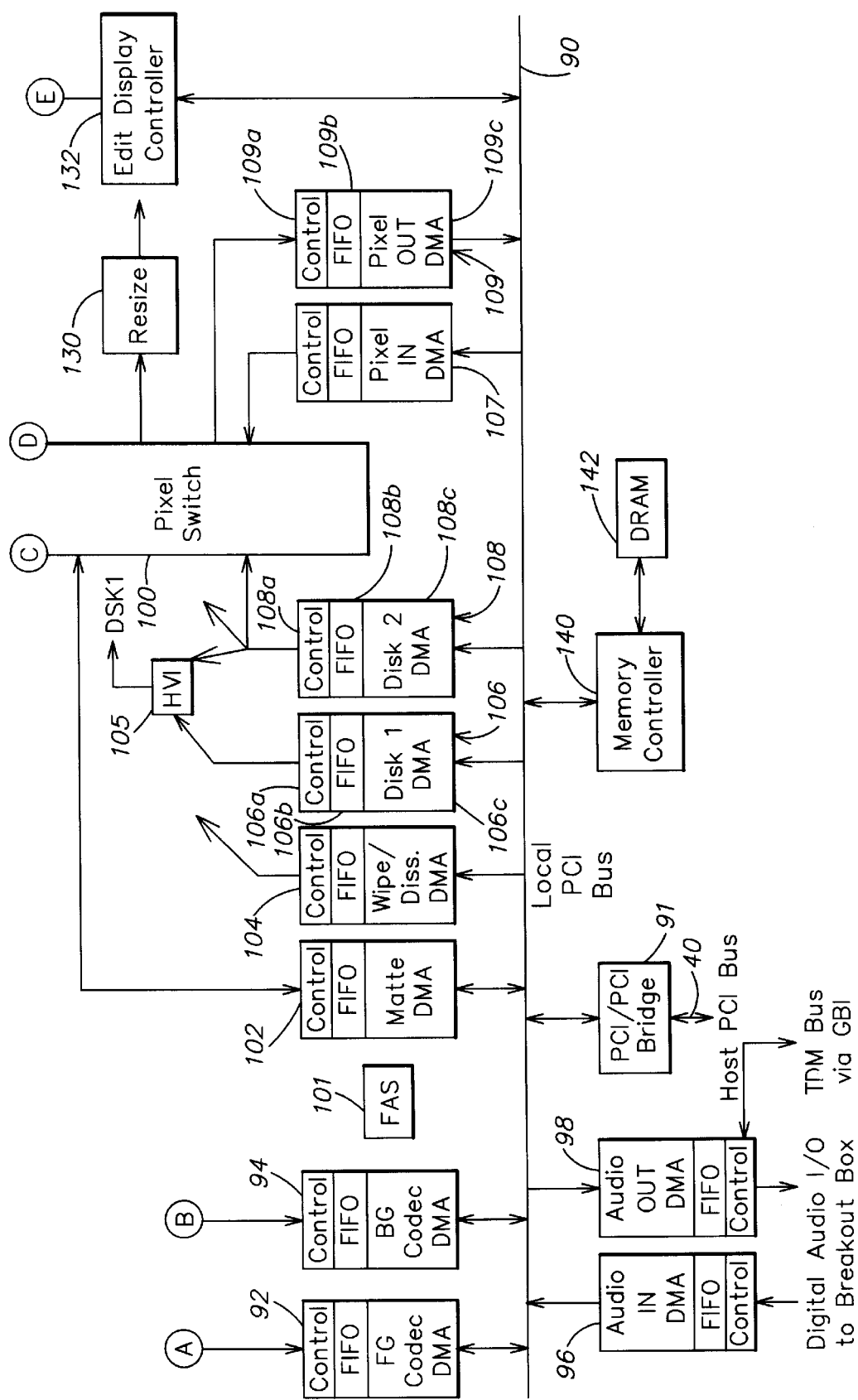

Referring now to FIG. 3, a block diagram of the datapaths of the video processing device 32 illustrates two play and record datapaths referred to for simplicity as a foreground datapath 70 and a background datapath 80. The processing datapaths are each bi-directionally coupled to local bus 90, which couples the video processing device 32 to the host computer 30 (FIG. 1) using bus interface 91. In one embodiment, the local bus 90 is controlled under the PCI protocol, although this is not a limitation of the invention.

In one embodiment, each of the play and record datapaths include similar elements for processing a video data stream. Each of the elements may be operating on different portions of a data stream simultaneously, and thus form a data processing pipeline. In one embodiment, the elements of the data processing pipeline operate asynchronously, with data transfer being data flow controlled between the elements. Control over the progress of the data processing pipeline is maintained by a Field Advance State machine (FAS) 101. Enable signals (not shown for purposes of clarity) are forwarded to each pipeline to enable the elements within the pipeline to begin processing a new image. When each pipeline has completed processing of an image, it signals the FAS, which allows control data to be updated for processing the next image as is described in more detail below.

One method of implementing the FAS and data flow control is described in pending patent application entitled "Apparatus and Method for Controlling Transfer of Data Between and Processing of Data by Interconnected Processing Elements", Ser. No. 08/879,981, filed Jun. 20, 1997 and incorporated herein by reference. Various implementations for the interconnect and a protocol for controlling data flow over the interconnect are described in: U.S. patent application Ser. No. 08/879,981; U.S. Patent Application entitled "Apparatus and Method for Controlling Transfer of Data Between and Processing of Data by Interconnected Data Processing Elements," filed Apr. 3, 1998, by Craig R. Frink et al.; and U.S. Patent Application entitled "A Packet Protocol for Encoding and Decoding Video Data and Data Flow Signals and Devices for Implementing the Packet Protocol," filed Apr. 3, 1998 by Craig R. Frink, et al.; and U.S. Patent Application entitled "Method and Apparatus for Controlling Data Flow Between Devices Connected by a Memory," filed Apr. 3, 1998 by Craig R. Frink, which are hereby incorporated by reference.

The general operation of each of the elements on the video processing device will now be described. A more detailed description of the functionality and features provided by the elements in the processing datapaths 70 and 80 is provided later herein.

Provided in each of the foreground and background processing datapaths 70 and 80 are codecs 72 and 82 for compressing and decompressing the video data stream. Data is passed between the codecs 72 and 82 and respective raster to block converters 74 and 84, where the term raster to block converter is used to denote both raster to block and block to raster conversion. Internal to the raster to block converters 72 and 82 is a mode bit, programmable by the host computer 30, for controlling the direction of transfer of image data in the raster to block converter. The raster to block converter translates a data stream either from 8×8 pixel block format to image raster format when received from the codecs, or alternatively from image raster format to 8×8 pixel block format when received from the resize block 76. Associated with each of the raster to block converters 74 and 84 are respective (SRAM) devices 75 and 85. The SRAM devices 75 and 85 may be used for external storage of data during the conversion operation and thus provide greater elasticity for data processing in the datapath processing pipeline.

Coupled to the each of the raster to block converters 74 and 84 is a respective resize unit 76 and 86. The resize units 76 and 86 operate to resize the received data steam to support conversions from 640 to 720 pixel lines, conversion from low resolution media (320 or 352 pixels) to 720 pixel lines, and fixup resizing (scaling up). The resize units 76 and 86 may also be used to scale down image raster data to support picture-in-picture applications. For digitize, the resizer is intended to support reducing the number of pixels per line, and to scale a full frame down vertically for single field film resolutions.

Frame buffers 78 and 88 are provided in each of the background and foreground data paths 70 and 80. The frame buffers provide temporary storage of image raster data that is to be displayed or transferred to the host computer 30 for storage. In one embodiment the frame buffers may be used to support still frame and slow motion effects and recreation of 3–2 pull down, for converting film rates to video rates, by controlling the rate at which components in the image data stream are written to the frame buffer memory.

Typically, video processing systems have included only one frame buffer which stored image data after it had been blended with other data streams. In such systems, slow motion effects were typically achieved by changing a pixel output rate programmed by a coupled RAMDAC device. By locating the frame buffers before the blending operation, and providing a separate frame buffer for each of the data streams, independent slow motion effects may be provided in each of the processing datapaths by appropriately controlling the write applications to the associated frame buffer. Implementation details for supporting such effects are described later herein.

Three mixers 120, 124 and 128 are provided for blending data streams. Each of the mixers receives two data streams and an α data stream. In general, the mixer 120 is used for performing wipes and dissolves. A wipe is a transition between the two streams of data in datapaths A and B. For example, one type of wipe is a box wipe, for transitioning between two streams defined by a rectangular shape. A box wipe may be used for displaying a window, where data representing the pixel data in the window is provided from a first video stream, while data representing a background image on which the window is displayed is provided from a second video stream. Blending of two streams (A and B) of video typically involves the application of the function αA+(1α)B to the streams of video information, where the α value may vary from pixel to pixel within the image, and where A and B, at any given point in time, are pixels in corresponding frames in the two streams.

Each effect is applied to one frame from each of the two streams. Given α, at any point in time and the addresses for pixels A and B, an output image can be generated. The blenders 120, 124 and 128 which perform this operation of combining αA+(1α)B can be implemented using standard digital hardware design techniques. The value of α applied to the pixels in the two video streams is dependent upon the kind of effect to be provided. For example, dissolves, which are a form of wipes, use the same α for all pixels in one frame, and the α value is gradually varied among subsequent frames.

Down stream keying mixers 124 and 128 may be used for blending title, graphics or still image data into the blended data stream provided from mixer 120. In particular, the use of two down stream keyers 124 and 128 facilitates rolling and crawling of titles. As will be described in more detail below, the sources of the A, B and α data streams for each of these mixers is dependent upon an operating mode of the video processing device 32.

In this embodiment there are ten independent Direct Memory Access (DMA) channels provided on the video processing device. Each of these channels provides an interface for storing specific types of data that are transferred between the host computer 30 or local memory 142 or break out unit 20 (for digital audio) and the video processing system 32. Foreground DMA channel 92 and background DMA channel 94 provide buffering of data streams in the foreground and background datapaths. A single channel Audio In DMA channel 96 and Audio Out DMA channel 98 is used to support up to eight tracks of audio. A Matte DMA channel 102 is provided for intermediate storage of matte images. The Matte DMA channel 102 is also used to store external α values for mixing with the foreground datapath 70. To provide flexibility in defining new wipe patterns, control to the foreground/background mixer is supplied by a Wipe/Dissolve DMA channel 104.

As described above, two down stream keying (DSK) DMA channels 106 and 108 feed the downstream keyers. In one embodiment, the data in the DMA streams for the down stream keyers is run length encoded to reduce the required bandwidth without introducing compression artifacts. One method and apparatus for performing run length encoding on the data in the DMA streams is described in pending patent application attorney docket number A0521-7138, entitled "Method and Apparatus for Encoding and Decoding a Data Stream Using Inferential Techniques", filed on even data herewith by Kurtze et al. In one embodiment, a horizontal vertical interpolator 107 is provided between DSK1 channel 106 and DSK2 channel 108 to support rolling and crawling of titles as will be described in more detail below.

Two pixel DMA channels 107 and 109 are also provided for temporary storage and transfer of uncompressed intermediate results between the host computer 30 or a local memory 142 and the video processing device 35 when rendering composite images. Such an arrangement allows rendering to be performed on uncompressed images, thereby providing zero loss rendering support.

Access to local memory 142 is controlled by memory controller 140. Local memory 140 is used for temporary storage of data transferred between the host computer 30 and the video processing device 32 or for intermediate storage of rendering results. The local memory 140 increases the overall performance of the video processing device 32 by reducing latencies associated with obtaining data from host computer 30.

In one embodiment, a bridge 91 is disposed between the DMA channels on the local bus 90 and the host bus 40 to reduce the loading on the host bus 40. Each of the DMA channels, such as DMA channel 109, includes control logic 109a, for interfacing the DMA channel to the coupled device, a FIFO 109b for providing intermediate buffering of data in the channel and DMA bus interface logic 109c for coupling the channel to the local bus 90. The control for arbitrating for bus 90 is distributed among the channels.

An edit display controller 132 is included on the video processing device 32 to increase the quality of the video displayed on the edit desktop. A resizer 130, such as the Genesis gm833x2 resizer is coupled in the data stream feeding the display controller 132 to resize a full size CCIR601-2 data stream down to the selected window size and to correct from CCIR601-2 sampling to square pixel aspect ratio. The edit display controller 132 supports two video windows and stores the data in off screen memory in the frame buffer in YcbCr 4:2:2 format regardless of the number of bits per pixel in the graphics data. The video data is then converted to RGB on the fly by a RAMDAC 136.

The Pixel Switch

Many data paths on the video processing device 32 converge on the pixel switch 100. The pixel switch 100 is a multi-input/multi-output switch device. Flow control signals propagate through the switch to enable couplings between the various input and output datapaths.

Figure 4:
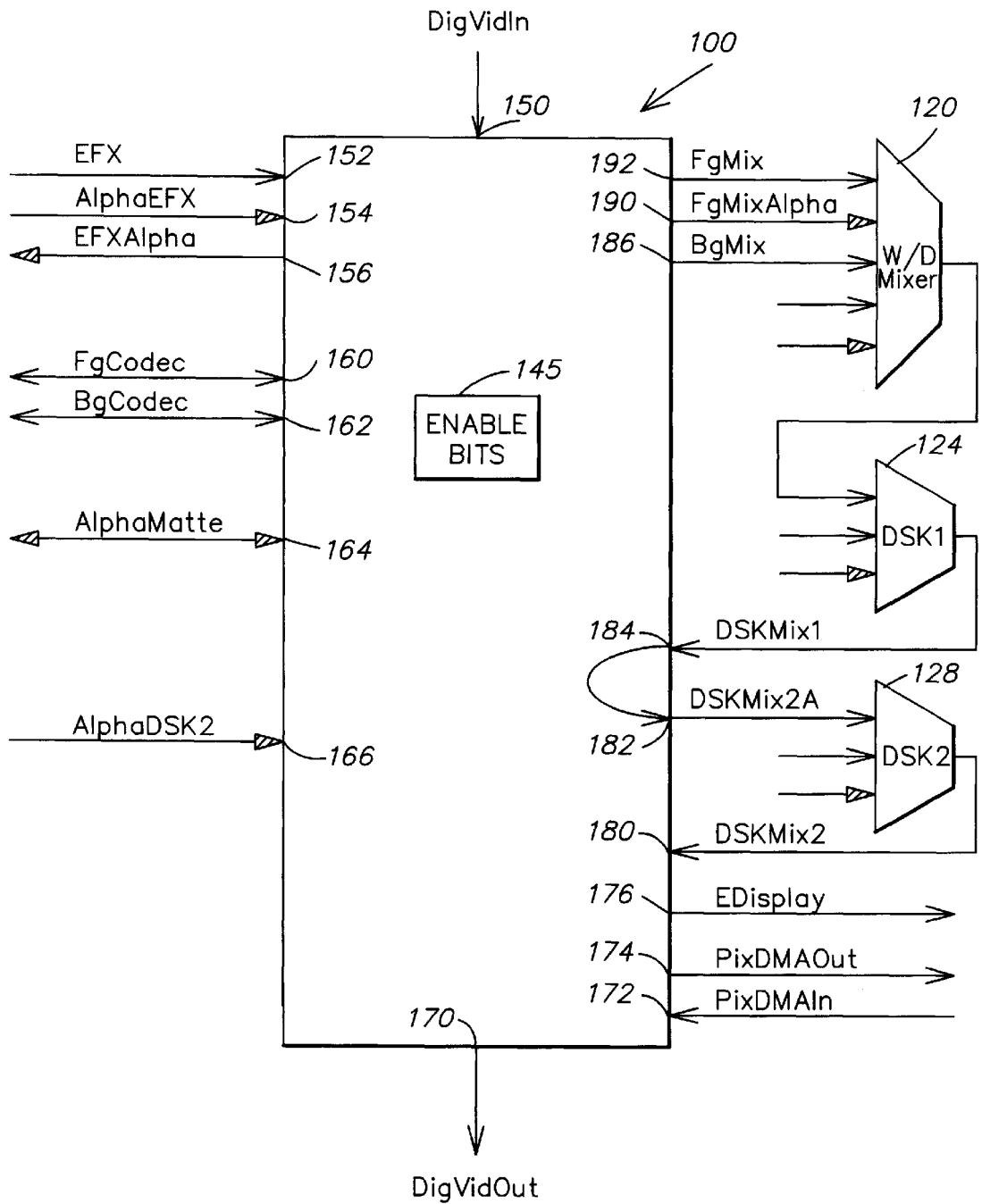
FIG. 4 is a block diagram illustrating input and output connections of a switch employed in the video processing device of FIG. 3.

The input and output datapaths of the pixel switch 100 are shown in FIG. 4. The pixel switch 100 has seven input ports including: DigVIDIn port 150 for receiving data from break out unit 20, EFX port 152 and Alpha EFX port 154 for receiving CbYCr data and Alpha data, respectively, from coupled effects devices 34 or 36, an Alpha DSK2 input port 166 for receiving α and/or Matte data for the second down stream keying mixer 128 from DSK2 DMA channel 108, A DSKMix1 port 184 for receiving data from the first down stream keying mixer 124, a DSKMix2 port 180 for receiving data from the second down stream keying mixer 180 and a PixDMAIn port 172 for receiving pixel data from the PixDMAIn channel 107.

The pixel switch 100 also includes three bi-directional ports including the FgCodec port 160, the BgCodec port 162 and the AlphaMatte port 164. The FgCodec port 160 and BgCodec port 162 are used to transfer data between the pixel switch 100 and the respective foreground and background data paths 107 and 108. The AlphaMatte port 164 is used to transfer α and/or Matte data between the pixel switch 100 and the Matte DMA channel 102.

Seven output ports are provided in the pixel switch 100. The seven output ports include: an EFX Alpha port 156 for transferring α data to a coupled effects device, a FgMix port 192, FgMixAlpha port 190 and BgMix port 186 for transferring data to mixer 120, a DSKMix2A port for transferring mixed data from the first down stream keying mixer 124 to the mixer 128, an Edisplay port 176 for transferring data to the edit display controller 132 for display on the computer monitor, and a PixDMAOut port 174 for transferring data to the Pixel Out DMA channel 109.

Figure 5:
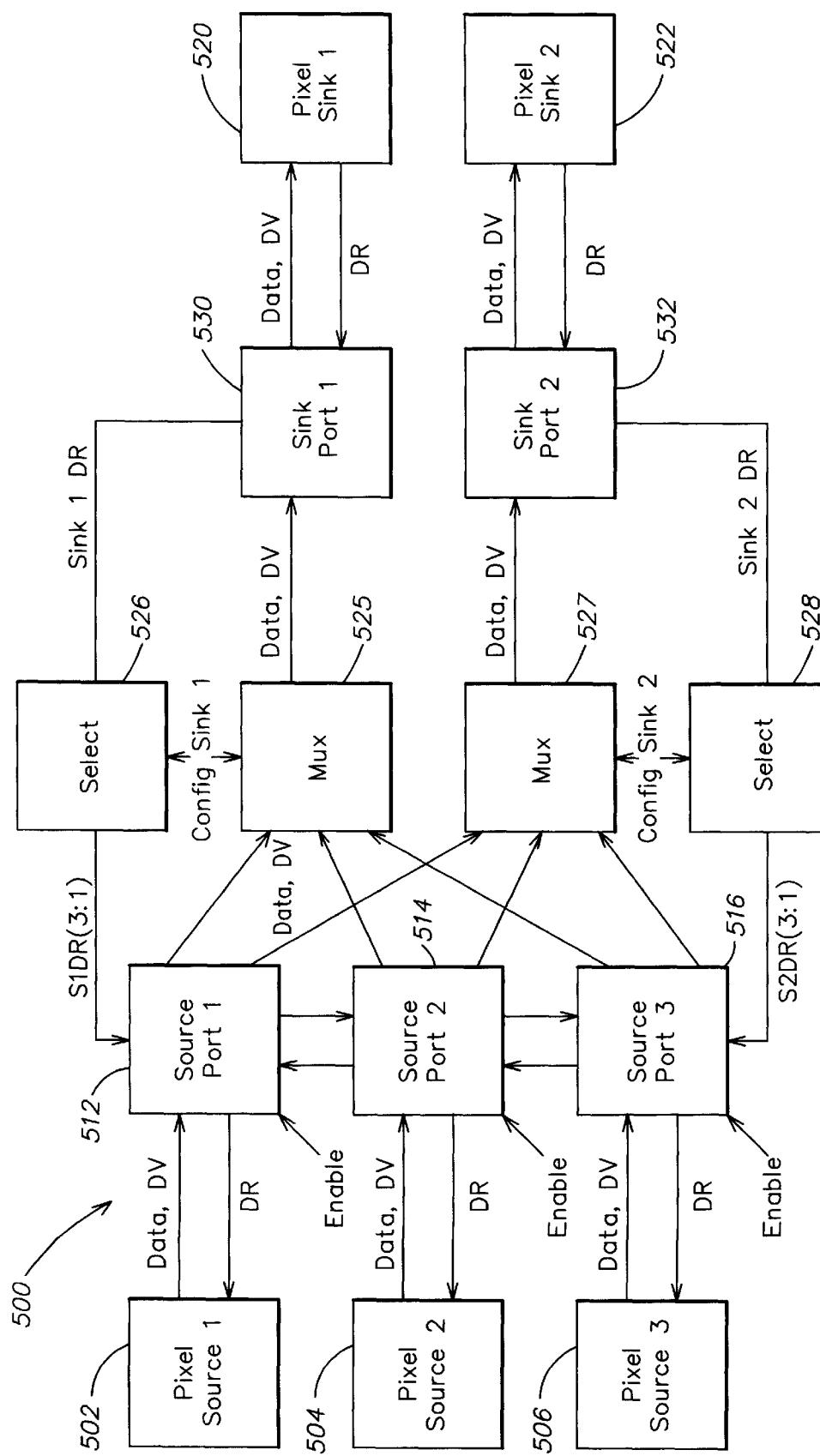
FIG. 5 is a block diagram of one embodiment of the switch of FIG. 4.

Referring now to FIG. 5, an example of one embodiment of a switch 500 that may be used for the pixel switch is provided. For purposes of clarity, the switch 500 is shown having only three source inputs and two outputs (sinks). The switch design may be readily extended to cover the input and output couplings of pixel switch 100 by one of skill in the art.

The three sources to switch 500 are source 502, source 504 and source 506. The two outputs are sink 520 and sink 522. The sources 502, 504 and 506 are coupled to respective input ports 512, 514 and 516, while the sinks 520 and 522 are coupled to respective sink ports 530 and 532.

Associated with each sink port is a multiplexer and select logic pair. For example, multiplexer 525 and select logic 526 are used to provide data to sink port 530 while multiplexer 527 and select logic 528 are used to provide data to sink port 532.

Flow control signals DV and DR are exchanged between the sinks, sources and their respective ports. The DV flow control signal indicates that data on the associated line is valid. The DR flow control signal indicates that the associated receiver is ready to receive data.

The multiplexers 527 and 528 are combinatorial logic which select one of the coupled source ports for output to the associated sink port. The select block permits the output device to exchange flow control signals with a coupled source port.

Source ports may be enabled or disabled by setting a mode bit in the pixel switch associated with the port. In FIG. 4, the mode bits for each of the ports are illustrated as enable its 145. If a source port is enabled, flow control signals operate to forward data from the source to the destination. If a source port is disabled, flow control signals for that port are inoperable. Thus, the source port does not send a Data Ready signal to an upstream device, and no data flows into the pixel switch.

The present invention is not limited to the embodiment of the switch illustrated in FIG. 5. Rather, any switch design capable of coupling one or more inputs to one or more outputs while maintaining flow control may be used. Alternative methods of transferring data between multiple sources and multiple destinations are described in "METHOD OF CONTROLLING SWITCHING OF CONNECTIONS AMONG DATA PROCESSING DEVICES", by Craig R. Frink, attorney identifier number A0521/7147, filed Apr. 3, 1998 which is incorporated herein by reference.

Operating Modes of the Video Processing Device

The pixel switch allows an input to be coupled to multiple outputs at any given time. With this arrangement, simultaneous play back and record may be achieved, different keying events may be added to a data stream, and a data stream may be displayed at multiple display devices with varying amounts of keying. As mentioned above, the mode of operation is controlled by a set of software accessible source enable mode bits 145 in the pixel switch. The mode of operations are described in more detail below with regards to FIGS. 6A–6S.

The modes of operation of the video processing device 32 may be divided into four distinct modes: play back mode, digitized mode, rendering mode, and miscellaneous operation mode.

Figure 6B:
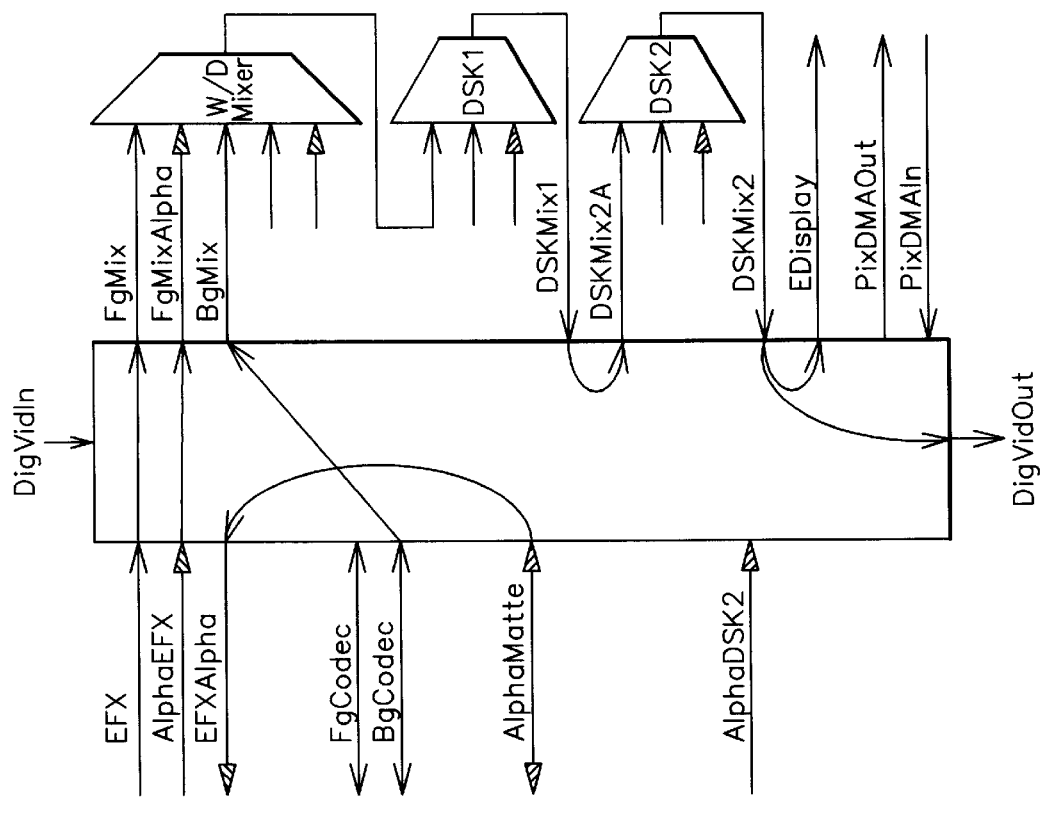
FIGS. 6A–6V illustrate a number of configurations connecting various inputs to various outputs in the switch of FIG. 4.
Figure 6A:
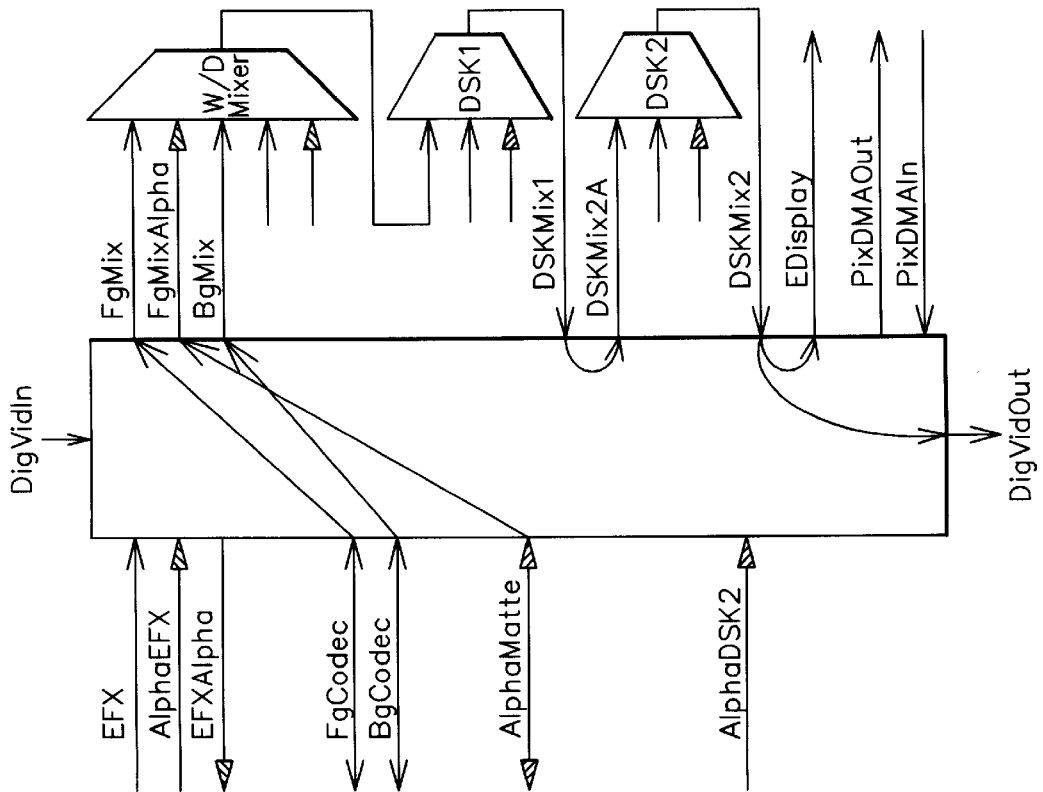

FIGS. 6A through 6E illustrate sample configurations of the pixel switch 100 during play mode. FIG. 6A illustrates basic play mode. In basic play mode, two streams of image data are blended using a wipe or dissolve. Two graphics can be independently keyed over the combined stream and the results can be routed both to the edit display and to the client monitor or another video processing device. Also the foreground stream may have an associated matte that may be used to mask the foreground over the background.

In basic play mode, the FGCodec port 160 is coupled to the FgMix port 192, the BgCodec 162 is coupled to the BgMix port 186 and the AlphaMatte port 164 is coupled to FgMmixAlpha port 190. In addition, as shown in FIG. 6A, output from the first down-stream keying mixer 124 is coupled to the input of the second down-stream keying mixer 128. The blended result is forwarded both to the Edisplay port for viewing on the edit desktop 50 as well as to the DigVidOut port for forwarding to the breakout unit 20.

FIG. 6B shows a configuration of the pixel switch 100 for use in playback mode when one of the data streams to be blended is received from one of the 2D or 3D special effects devices 34 or 36 (FIG. 1). This configuration is similar to the configuration illustrated in FIG. 6A, except that the α values for mixing the foreground over the background comes from the AlphaEFX port 154 and the foreground is provided from the EFX port 152.

α data received at AlphaMatte input port 164 from the Matte DMA channel 102 is forwarded to the EFX alpha output port 154. Forwarding the α data to the EFX device allows the coupled special effects device to perform digital video effects (DVEs) on any received Matte video stream. This pixel switch configuration may be used when the Matte video stream is a keyed graphic that needs be routed through the special effects device to rotate or fly the graphic in ways that can not be performed on the video processing device 132. In addition, such a pixel switch configuration could be used to perform DVE on a wipe pattern. For example, to rotate a wipe pattern, the wipe pattern may be forwarded from the AlphaMatte DMA channel 102 through the pixel switch 100 to the special effects device. The special effects device could then perform the rotation and pass the effected wipe to mixer 120.

Figure 6D:
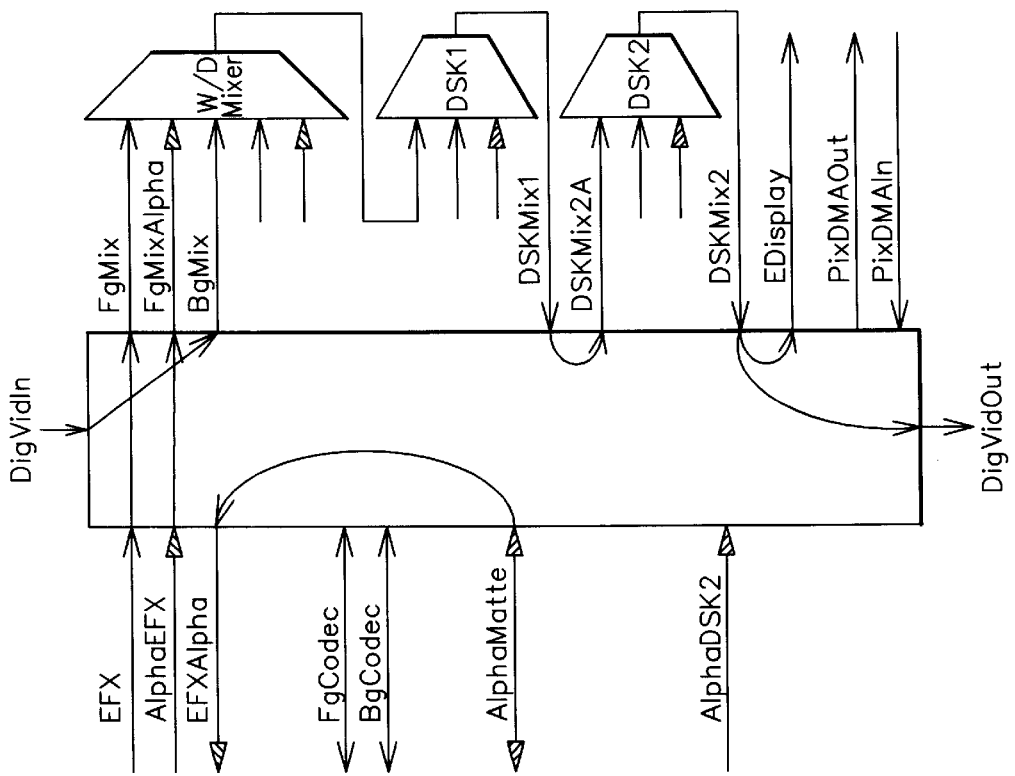
Figure 6C:
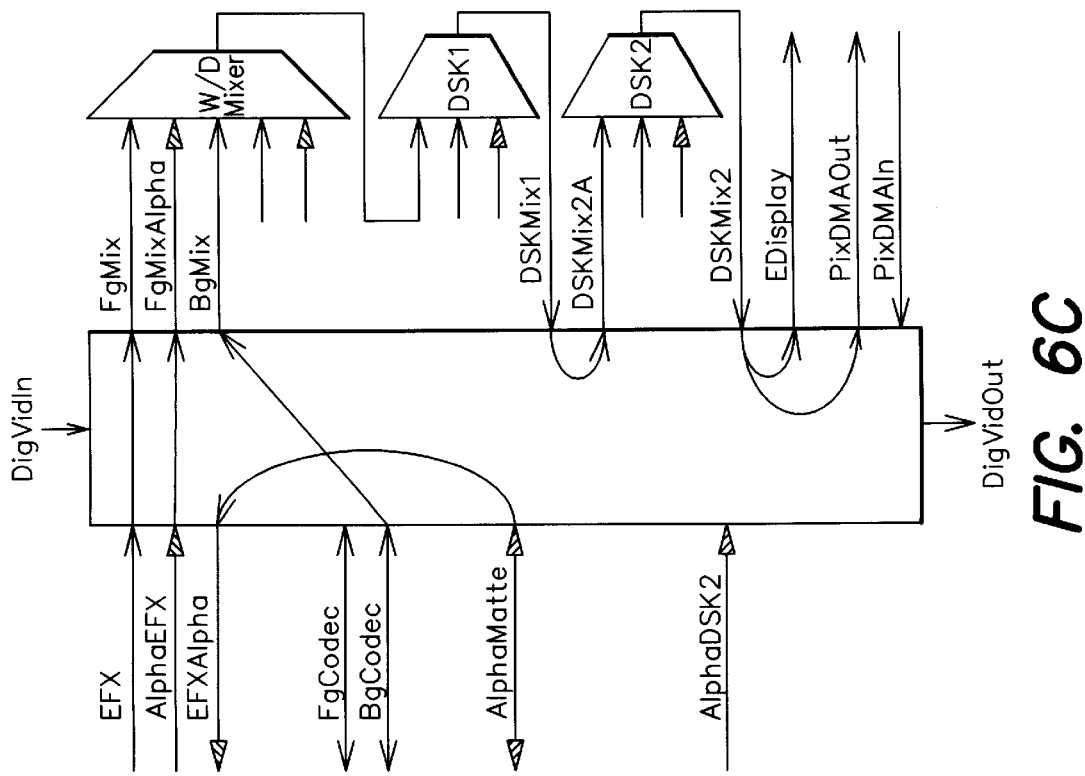

FIG. 6C illustrates a playback mode configuration of the pixel switch for playing the blended video stream directly to a host memory. In this mode, frames that are forwarded to the display via the Edisplay port 176 may also be forwarded to the PixDMAOut port 174. The data from PixDMAOut port 174 is forwarded through the PixDMAOut channel 109 to the host computer 30 or to local memory 142.

FIG. 6D illustrates a playback mode configuration of the pixel switch 100 when the pixel switch is in a video processing device that is another video processing device. For example, the configuration illustrated in FIG. 6D may be the configuration of pixel switch 100 in the video processing device 32 of FIG. 2. In the pixel switch configuration of FIG. 6D, the BgMix port 186 of mixer 120 receives a video data stream from the break out unit 20 via DigVIDn port 150. The video data stream is blended with data from the coupled special effects card by mixer 120. The blended results are forwarded to the Edisplay output port 176, and also to the DigVIDOut port 170. If there is another video processing device coupled in the cascade, it receives the data stream from the DigVIDOut port at its DigVIDIn port. The configuration of the switch at the second processing device may appear similar to that in FIG. 6D, where additional effects are blended with the data stream. The edit desktop may be coupled to any one of the video processing devices in the cascade via the Edisplay output port 176. Alternatively, there may be more than one edit desktop provided, one for each of the video processing devices in the display.

Cascading video processing devices allows N+1 streams may be processed simultaneously, where N is the number of video processing devices that are coupled together. The number of data streams that may be processed are limited only by physical design constraints (i.e., number of available slots and signal integrity issues) of coupling of numerous video processing devices into the video processing system. Allowing multiple data streams to be played simultaneously decreases the amount of time needed to process complex composite images and thereby improves the overall performance of the video processing system.

In addition, because each of the video processing devices may be coupled to different 2D or 3D effects devices, cascading video processing devices increases the amount of effects processing that may be performed on a data stream. In the configuration shown in FIG. 6D, the routing of the AlphaMatte data from the bi-directional port 164 to the EFXAlpha port 156 implies that a special effect device such as device 34 or 36 is could to the video processing device. Alternatively, if there were no coupled special effects device, the AlphaMatte data could be forwarded directly to the FgMixAlpha port 190 coupled to the mixer 120.

Figure 6F:
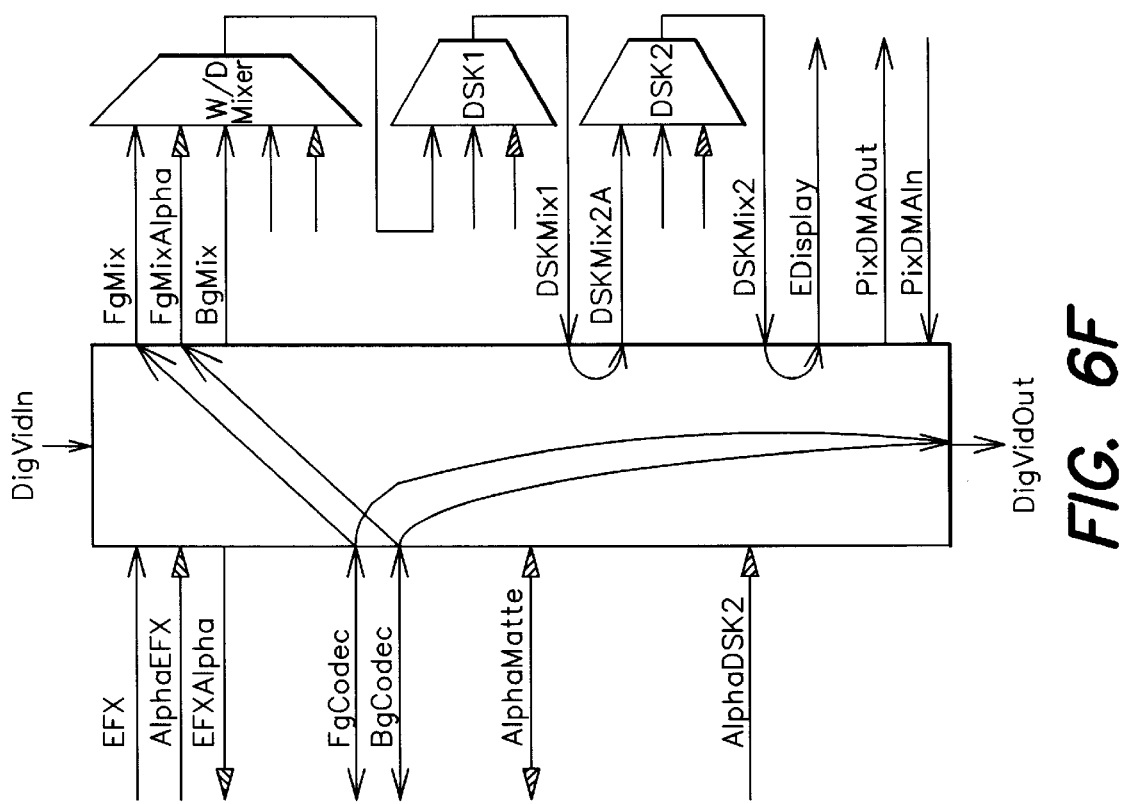
Figure 6E:
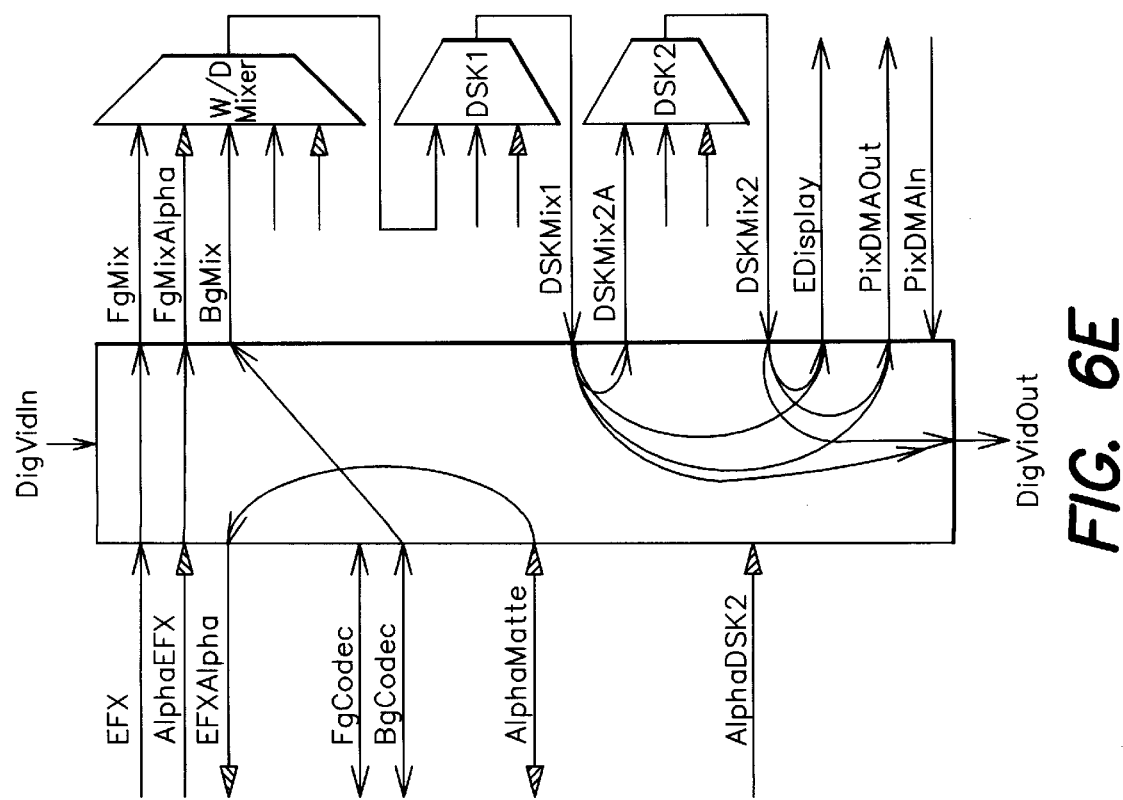

Another playback configuration is shown in FIG. 6E. Typically, the output of the second downstream keying mixer 128 is fed to the edit desktop 50 as well as to the monitor 58. In the general case, however, the output of either of the downstream keying devices 124 or 128 may be routed to any combination of the edit desktop 50, the monitor 58, and the PixDMAOut port 174 to the host computer 30 or local memory 142. FIG. 6E shows all the possible output paths to which the output data stream from the downstream keying mixer 128 could be coupled using the pixel switch 100.

FIG. 6F illustrates a configuration of the pixel switch 100 during playback of dual rolling trim. Dual rolling trim is a mode of editing for trimming two abuttig clips in a sequence, where both clips are played simultaneously to determine the optimum edit point. During dual rolling trim the mixer 120 would be used to switch between the sequences. The edit display controller is configured so that it displays both frames side by side simultaneously. Here, either the FgCodec port 160 or the BgCodec port 162 is connected to the client monitor. FIG. 6F shown the connections for both, although only one of the foreground or background would be coupled to implement this configuration.

FIGS. 6G–6N illustrate sample configurations of the pixel switch 100 during recording. In all the recording modes, the FgCodec port 160 and BgCodec port 162 are available to receive a video data stream from one of the other input ports of the pixel switch 100. As will be shown below, these configurations allow for single or dual resolution recording. In the recording configuration illustrated in FIG. 6G, source image data is input from the break out unit 20 via the DigVIDIn port 150. The source image data is forwarded through mixers 120, 124 and 128, thereby allowing one or two keys may be mixed with the source image data stream. The keyed video stream is forwarded to the FgCodec port 160 and BgCodec port 162 onto the background and foreground datapaths 70 and 80 for forwarding to the host or local memory, and optional compression or resizing. Simultaneously, the keyed image data stream is made available through the monitor 58 through DigVIDOut port 170. If keying is not desired, the DSK mixers 124 and 128 may be configured to allow pass through. The combined image data stream is also forwarded to the edit desktop 50 via the Edisplay port 176.

Figure 6H:
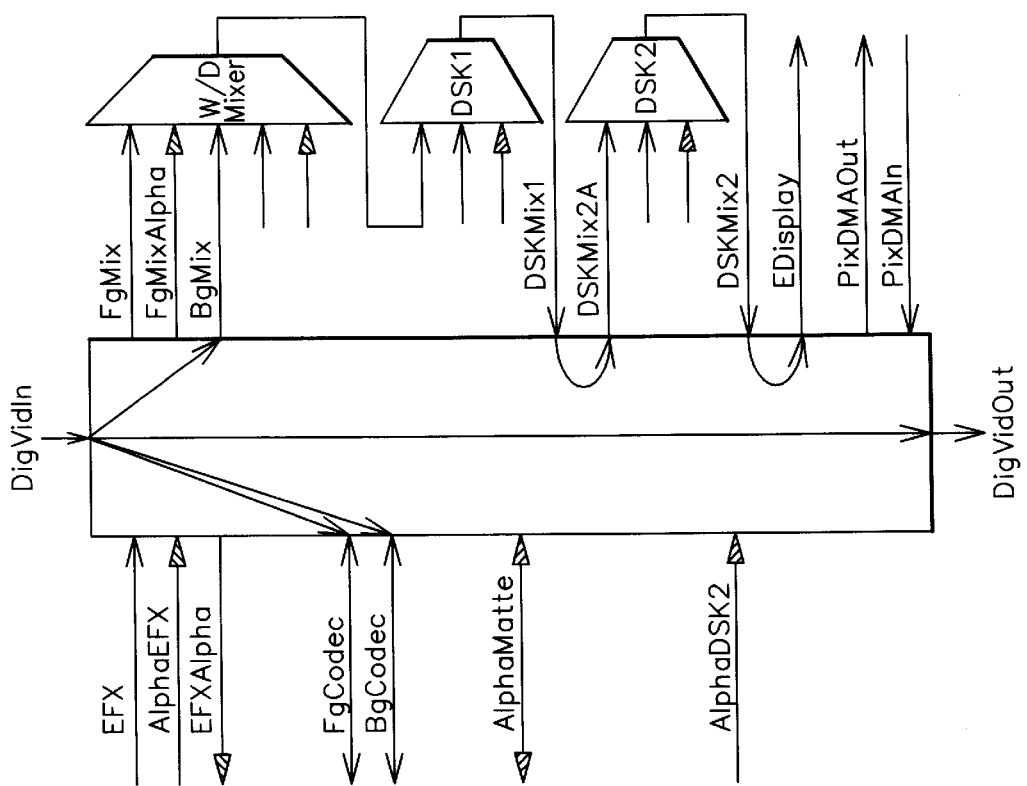
Figure 6G:
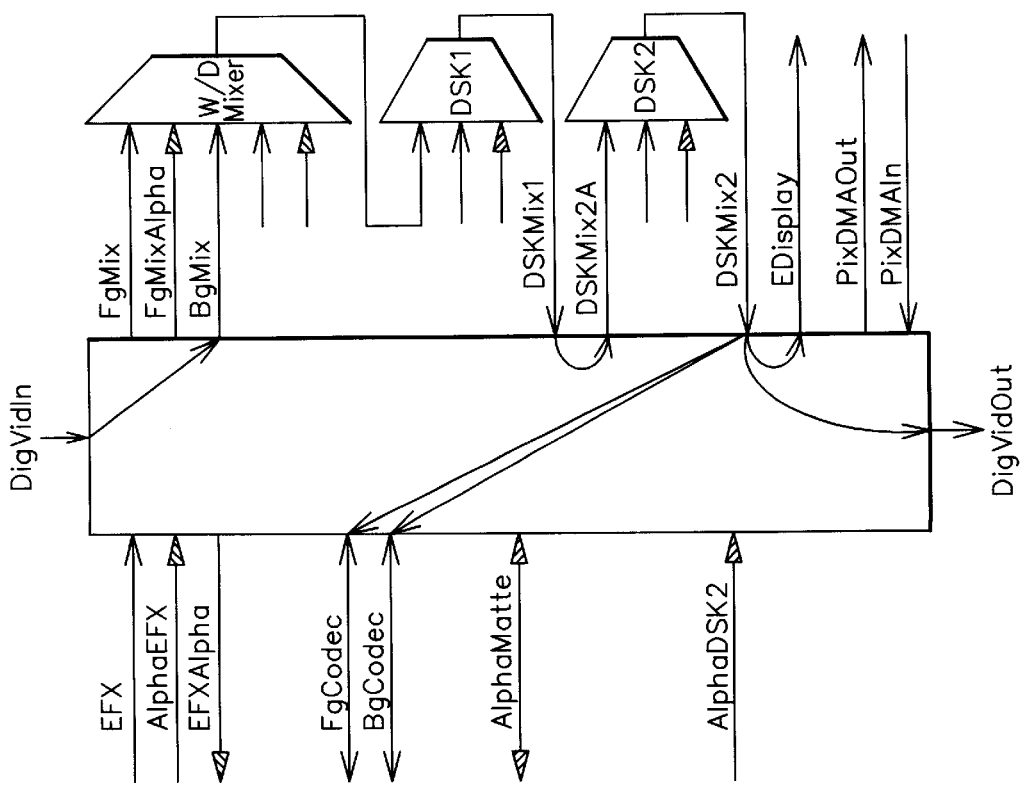

FIG. 6H illustrates a second configuration of the pixel switch 100 for recording data received from the break out unit 20 over the DigVIDIn port 150. In the configuration of the pixel switch shown in FIG. 6H, the image data stream is forwarded out of the DigVIDOut port 170 for display on a client monitor without keys. The data from the DigVIDIn port 150 also is fed directly to the FgCodec and BgCodec data streams. If it is desired to add keys to the data for display on the edit desktop 50, the image data stream may be forwarded through the mixers 120, 124 and 128 and out the Edisplay port 176. This configuration may be used to playing image sequences having icons for on the edit display while recording the image sequence without the icons.

Figure 6J:
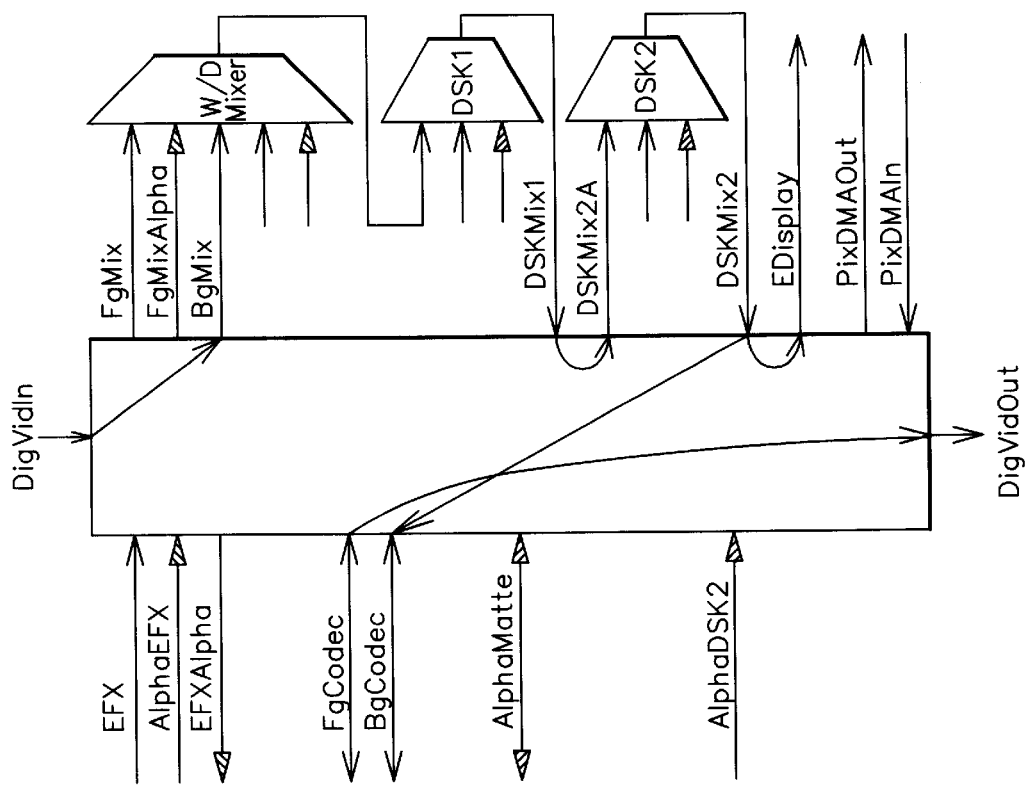
Figure 6I:
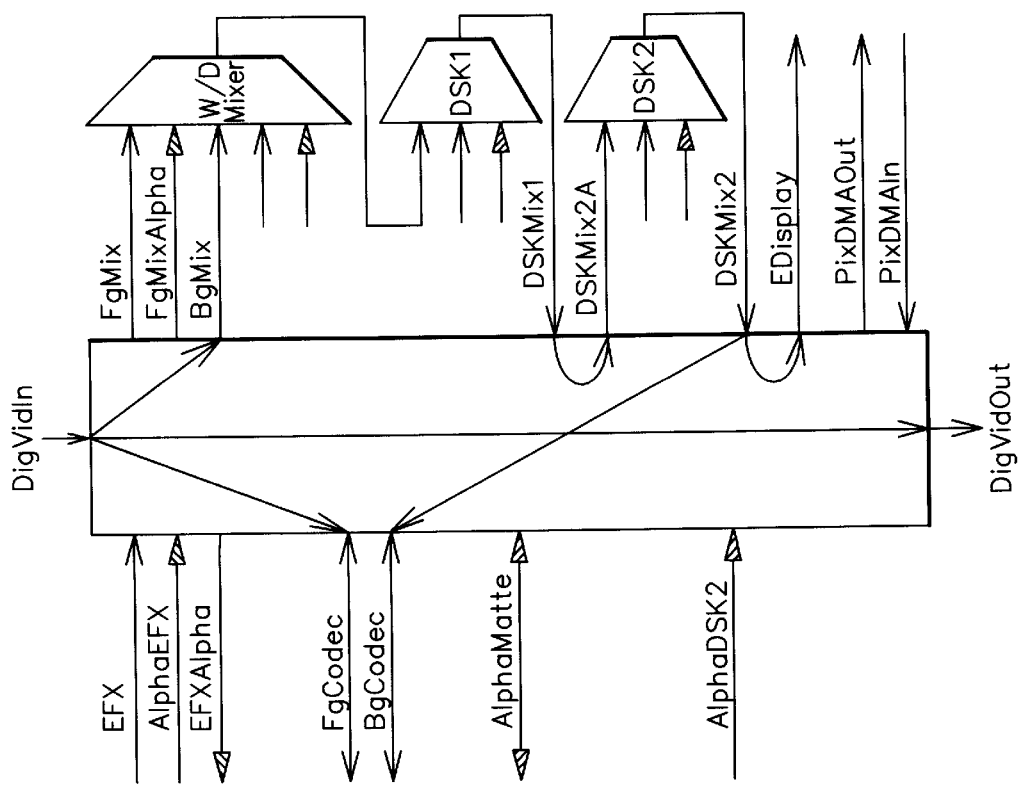

FIG. 6I illustrates a third configuration of the pixel switch 100 for recording data received from the breakout unit 20 over the DigVIDIn port 150. In this configuration, the BgCodec port receives, for forwarding to the host and optional compression or resizing, a version of the data stream that includes keys. The FgCodec port receives an unkeyed version. As in FIG. 6H, the edit desktop 50 displays a keyed version of the data stream while the monitor 58 displays an unkeyed version of the data stream.

FIG. 6J illustrates a configuration of the pixel switch 100 for performing simultaneous record and play back. In this configuration, one the BgCodec channel is used to record a data stream while the FgCodec channel is used to playing back a stream of video. The stream of video being played back on the FgCodec channel may either be a completely independent of the BgCodec stream, or it may be the retrieved BgCodec data stream, delayed by a frame. Playing back the recorded data stream allows the user to see the losses caused by compressing and decompressing the video data stream at the selected compression level. In one embodiment, a client monitor could be displaying the results of decompressing the immediately preceding compressed frame, while processing may be monitored on the edit desktop 50. This configuration could be used to preview or monitor the quality of the currently selected compression. Users may be able to switch back and forth between displaying the source video and displaying the compressed and uncompressed video.

Figure 6L:
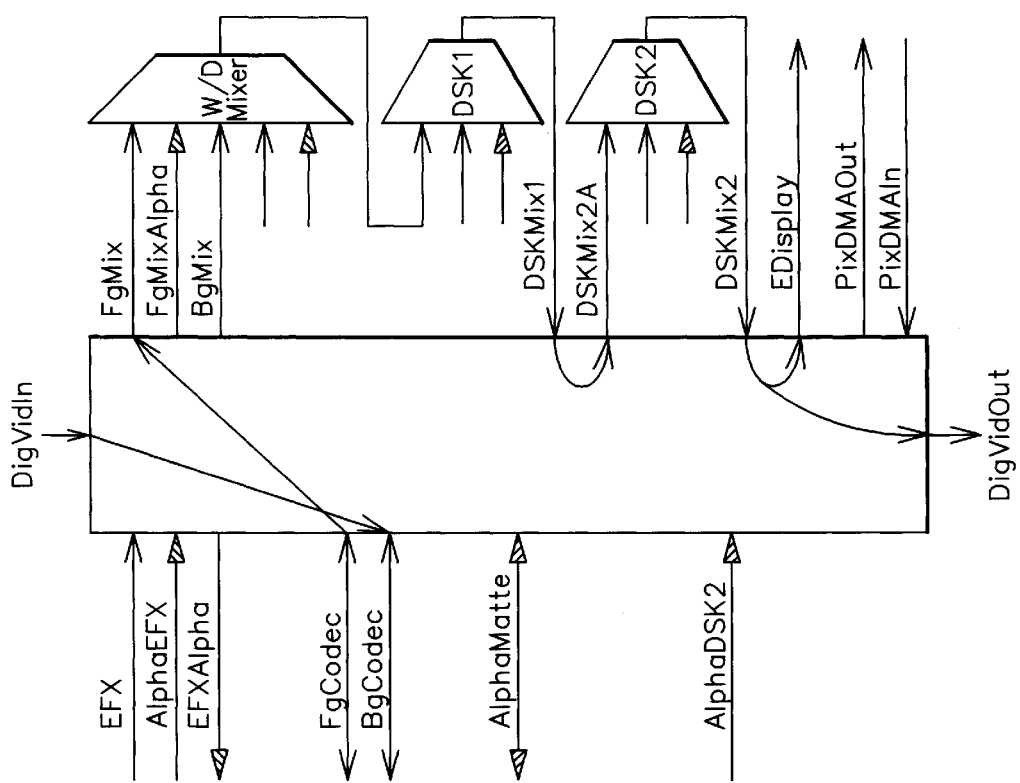
Figure 6K:
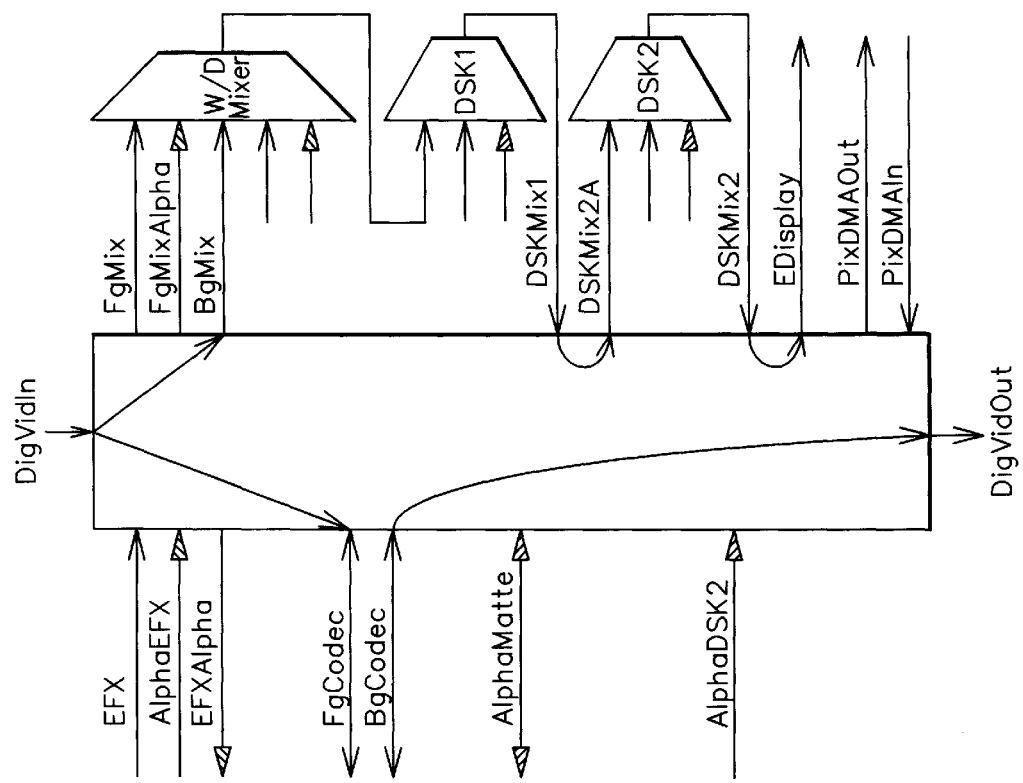

FIG. 6K illustrates another configuration of the pixel switch 100 for recording and simultaneous playback. In the configuration of FIG. 6K, the video data stream is not keyed prior to recording. However, the edit desktop displays the raw video with an overlaid key. Such a configuration may be used to display icons on an edit display that would necessarily get recorded. Again, the client monitor is displaying a separate stream of video that is either independent of the displayed stream or alternatively is the displayed stream, after compression and decompression, returning on the background path.

FIG. 6L illustrates a configuration of the pixel switch 100 where input data that is forwarded for recording is not keyed. However, the video data stream received at FgCodec port 160 and forwarded through mixers 120, 124 and 128 to the DigVIDOut port 170 for display on the monitor 58 and edit desktop 50 includes keys.

Figure 6N:
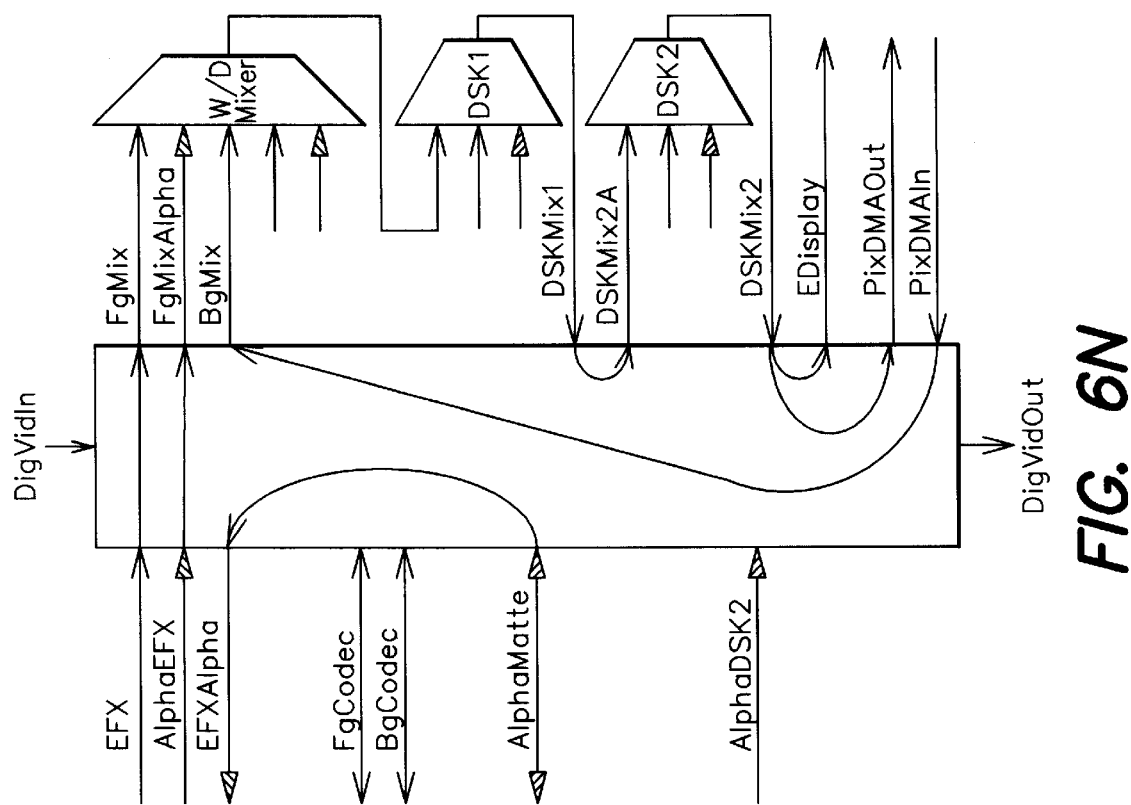
Figure 6M:
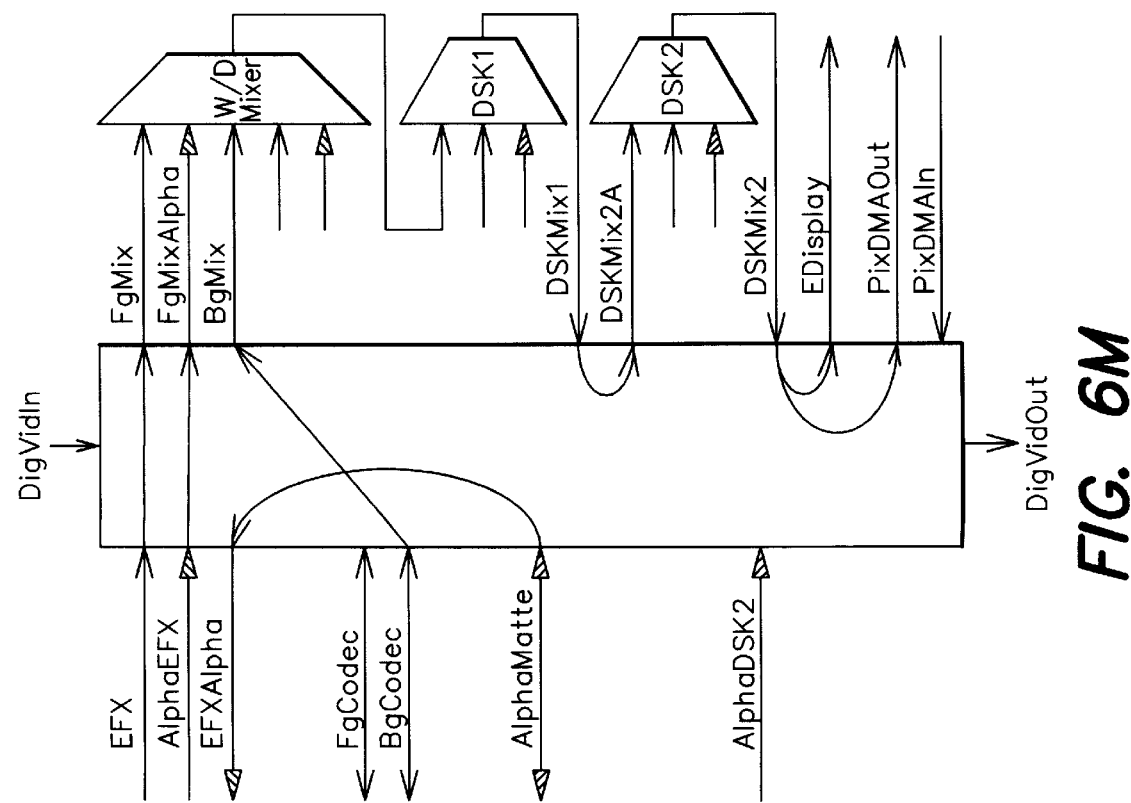
Figure 6P:
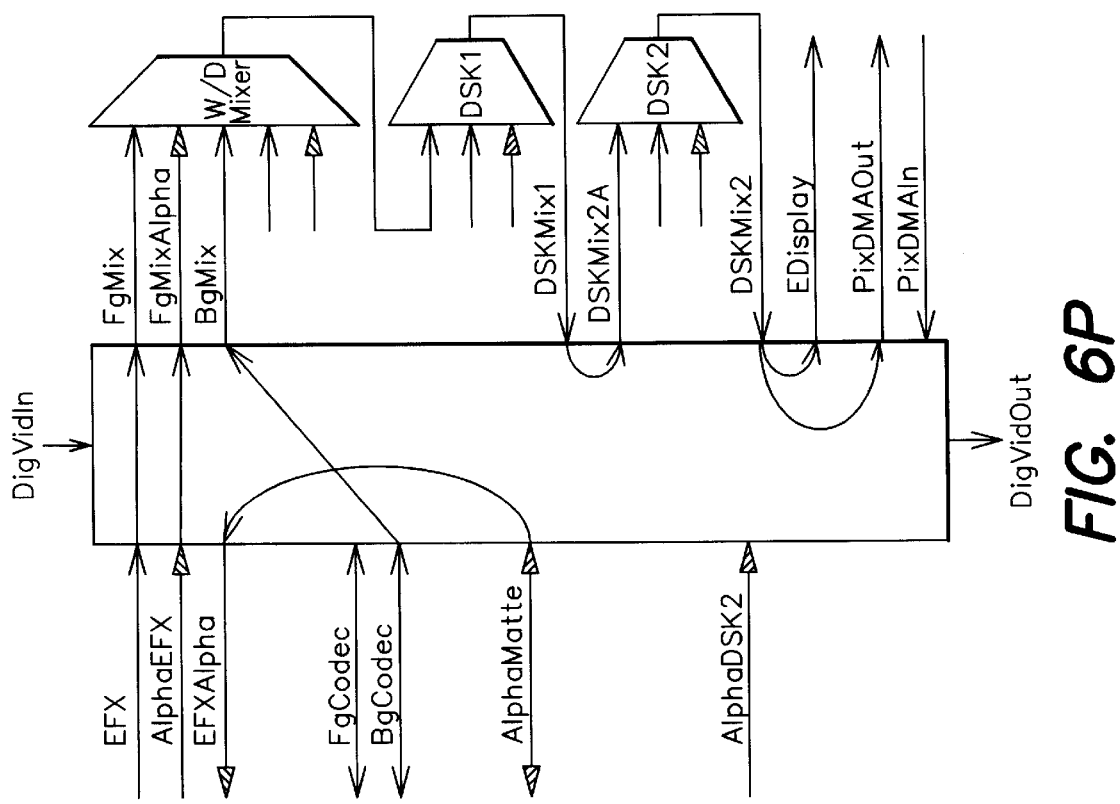
Figure 6O:
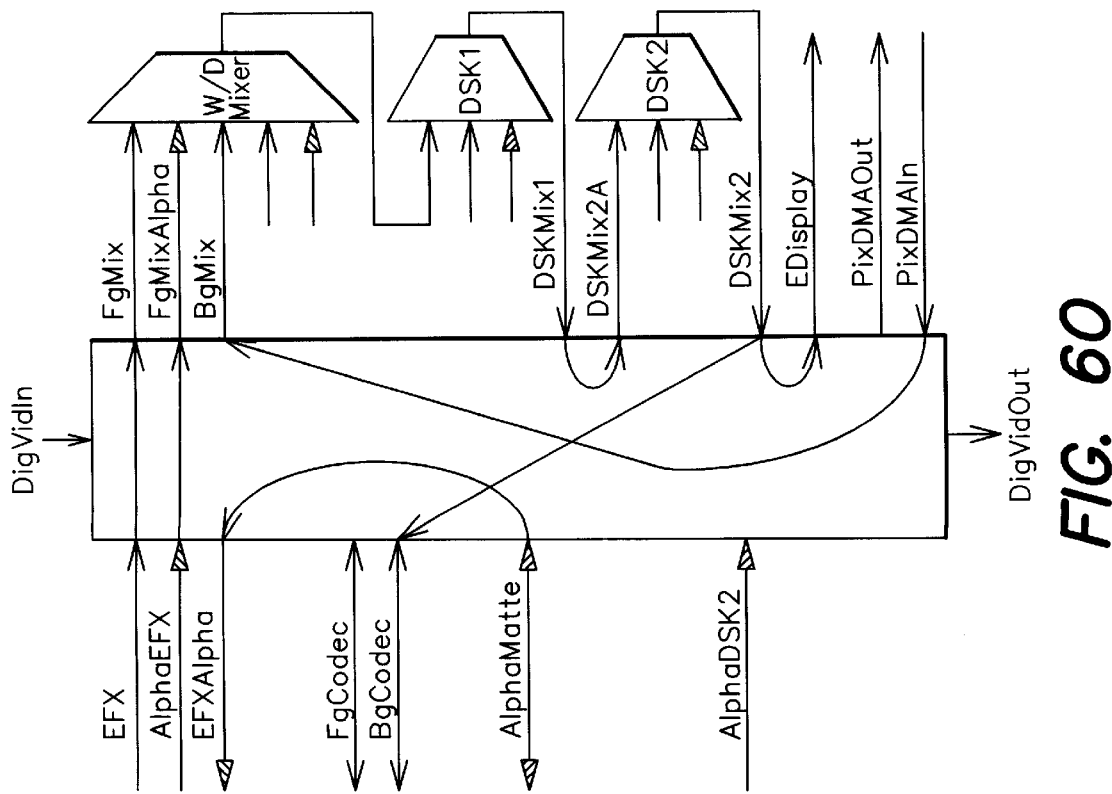

FIGS. 6M through 6R illustrate the configurations of the pixel switch for rendering operations. In particular, FIGS. 6M–6O illustrate the configurations of the pixel switch 100 for rendering a multi-layered effect. Rendering a multi-layered effect uses several different configurations of the pixel switch. For each of the layers, α data and video for the foreground are rendered by the attached special effects device and forwarded through input ports EFX 152 and AlphaEFX 154, respectively, to the FgMix and FgMixAlpha ports 192 and 190. As shown in FIG. 6M, to render the first two (bottom) layers, the data stream from the BgCodec input port 162 is forwarded to the BgMix port 186. As shown in FIG. 6N and FIG. 6O, for all other layers, the video data stream input from the PixDMAIn port 172 is forwarded to the BgMix port 186. As shown in FIG. 6O, for the final layer, the input from the second downstream keyer mixer 128 goes to the BgCodec port 162 for transfer to the host computer 30 or local memory 142 and optional compression and resizing. For layers other than the final layer, the input from the second downstream keying mixer 128 are forwarded to the host computer 30 or local memory 142 via the PixDMAOut port 174.

Referring now to FIG. 6P, the configuration of the pixel switch 100 for rendering a hierarchical nested effect is shown. When rendering a hierarchical effect the foreground is first rendering and then, for layers other than the first layer, the intermediate results are forwarded through the coupled special effects device and then mixed over a background layer. FIG. 6P illustrates a configuration of the pixel switch 100 for rendering the first two layers. The foreground is received from the special effects device on the EFX port 152. The background is received from on the BgCodec port 162, and the results are forwarded to the host computer 30 or local memory 142 from the PixDMAOut port 174.

Figure 6R:
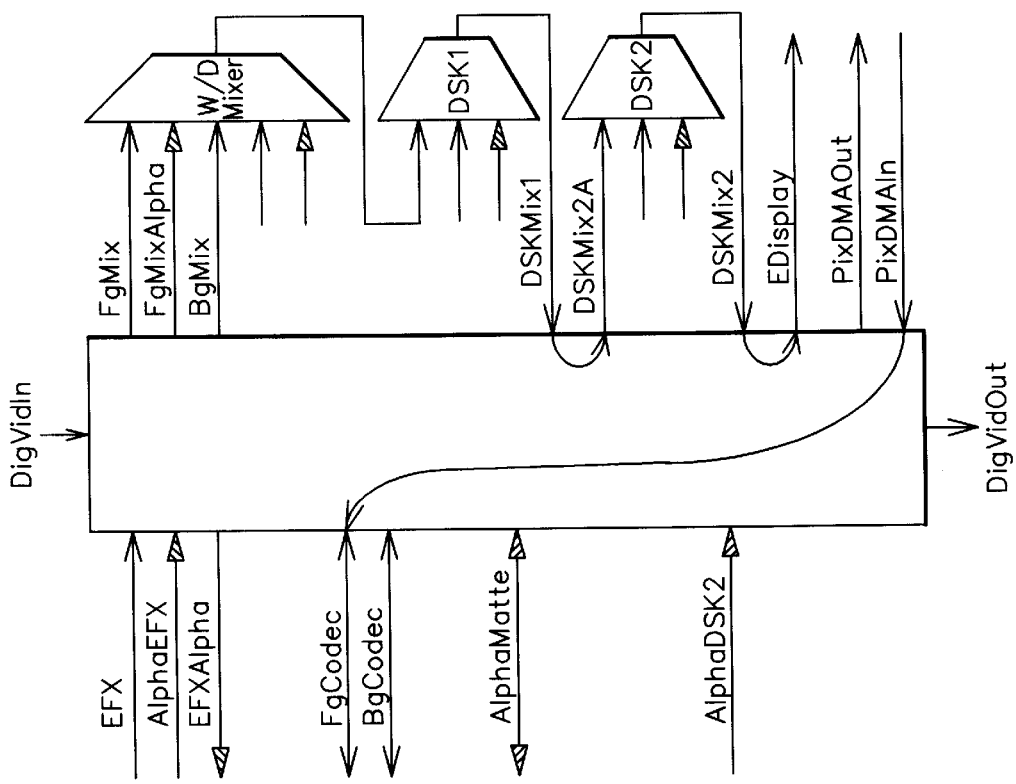
Figure 6Q:
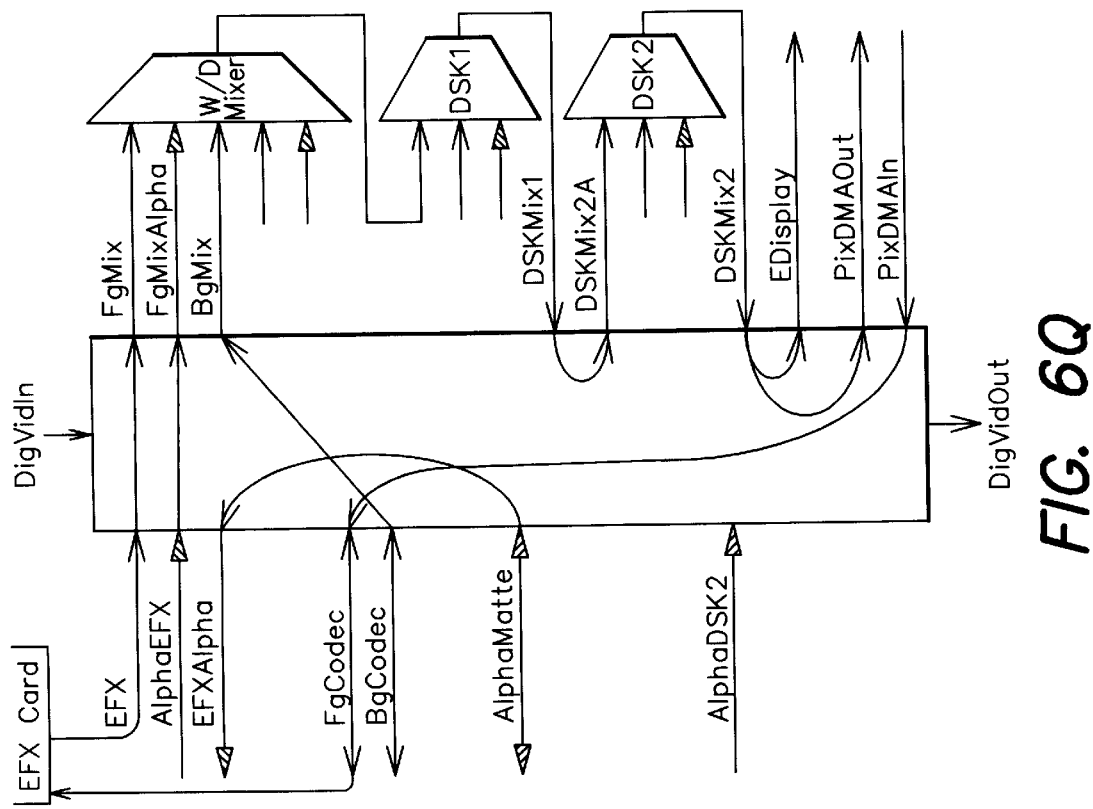

In FIG. 6Q, the configuration in pixel switch 100 for rendering intermediate layers when rendering hierarchical nested effects is shown. The FgCodec port 160 is used to pass uncompressed data received from PixDMAIn port 172 from host computer 30. The FgCodec port 162 is used to pass the next rendered layer to the BgMix port 186 for the mixer 120. Since both the FgCodec and BgCodec ports are in use, the resulting composite from mixers 120, 124 and 128 is forwarded in uncompressed format to the host computer 30 or local memory 142 via the PixDMAOut port 174 of the pixel switch 100. The final result of the composite is thus stored on host computer 30 or in local memory 142.

When rendering of the composite is complete, the configuration of the pixel switch is set to that illustrated in FIG. 6R. The uncompressed composite data is forwarded from the host computer 30 or local memory 142 via the PixDMAIn port 172 through the pixel switch 100 to the BgCodec port 162 for optional compression and resizing before storage in host computer 30 or local memory 142.

Referring now to FIGS. 6S through 6V, a number of other configurations of the pixel switch 100 are shown. In FIG. 6S, the configuration of the pixel switch 100 for writing video and alpha data to host memory 30 is shown. In the configuration illustrated in FIG. 6S, the coupled special effects device is used to create a new video frame and associated alpha data. The video and alpha data stream are forwarded through the mixers 120, 124 and 128 to add any keying. Note that no input data stream is input to the B port of mixer 120. This configuration may be desirable to process a scene shot on an blue screen to which a user would like to apply a non-real-time effect. In the configuration shown on FIG. 6S, the matte for keying may be calculated before the effect is applied.

FIG. 6T illustrates configuration of the pixel switch 100 for compressing a graphic. This configuration may be used to insert a graphic in the image either as a simple insert or for processing by a coupled special effects device. The graphic is retrieved from the host computer 30 or local memory 142 and forwarded into the switch through the PixDMAIn path 172 to the BgCodec port 162.

Figure 6V:
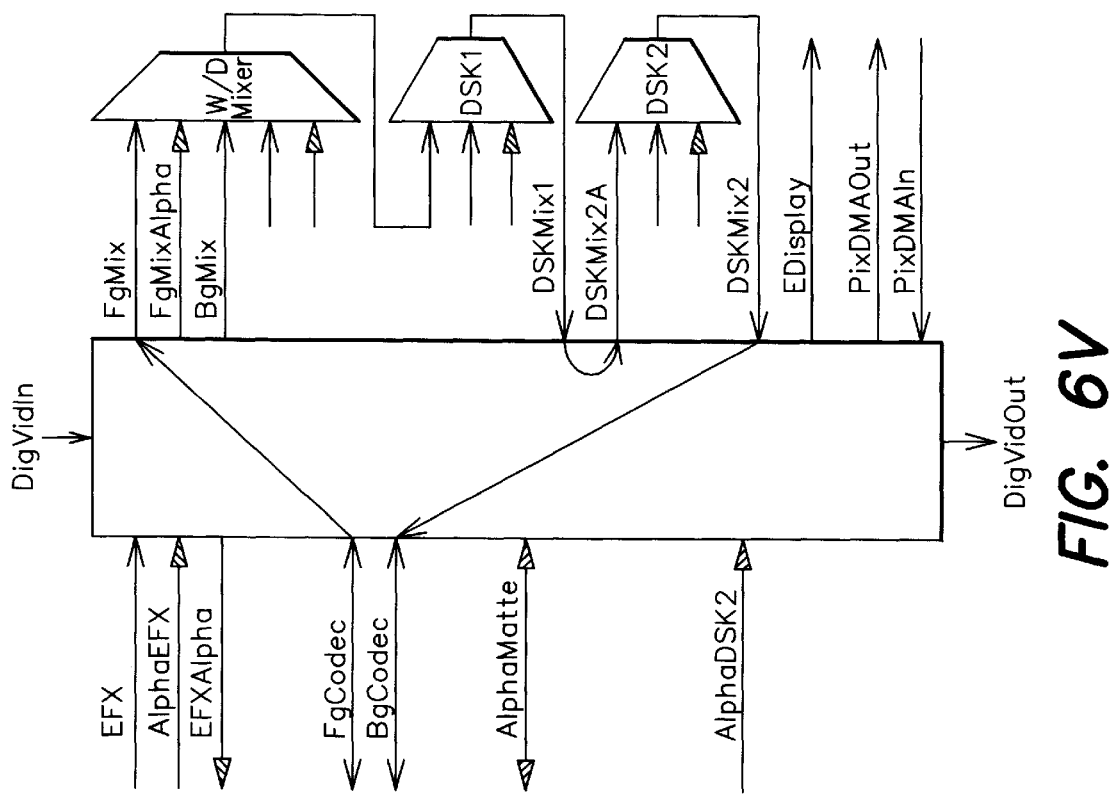
Figure 6U:
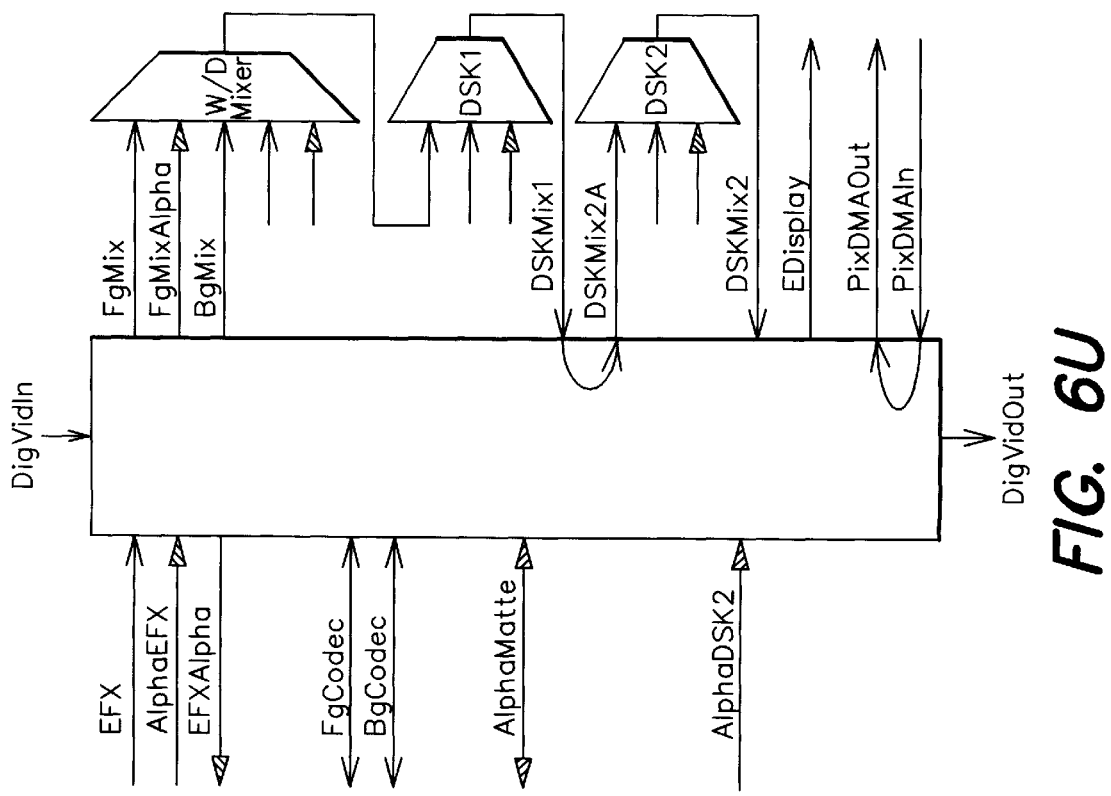

FIG. 6U illustrates configuration of the pixel switch 100 for color conversion. Video data, received from the host computer over the PixDMAIn path 172 is forwarded directly out of the PixDMAOut path 174. In this embodiment, the Pix DMA Input channel includes color conversion logic for performing YUV and RGB. Thus, this pass through effectively performs color conversion of the video data stream.

Referring now to FIG. 6V, a configuration of the pixel switch 100 for recompressing video, for example to a different resolution (30 Kbytes to 200 Kbytes, for example) is shown. In this configuration, the switch passes data received on the FgCodec input port 160 to the BgCodec output port 162 via the mixers 120, 124 and 128. The mixers may be used to add keying data, or the data stream may be passed through the pixel switch 100 with no keying.

Data Transfer Between Elements on the Video Processing Device

The width of data bits transferred between the elements on video processing device 32 depends upon the application being performed. For motion video data, both 8-bit and 10-bit data paths are suitable. In such an embodiment, the interface may be a single video component in width, according to an appropriate video format convention. For example, chroma and luma samples alternating on successive clocks following a 4:2:2 convention (CCIR610) may be supported. Other possible formats include, but are not limited to, RGB, 4:4:4, RGBA, 4x4 and 4:2:2:4. In general, the interface is format independent so long as the sender and receiver agree to a selected format.

As mentioned above, in one embodiment data is passed between elements on the video processing device 32 using flow control techniques. The general concepts under which each of the data flow control techniques operate are described below.

The flow control technique allows for processing on the video processing device to be data independent. For example, for digital motion video data the interconnect allows for format independence, temporal and spatial resolution independence, frame rate independence and variability, and faster than real-time transfer of compressed or uncompressed digital motion video data between processing elements.

In one embodiment, the video data stream may be received and displayed using either interlaced or progressive format. Generally, interlaced frames are translated to progressive format prior to compression to increase the possible amount of compression of the image, although this is not a limitation of the present invention. Logic within the frame buffer 78 rearranges the order of the interlaced frames prior to compression. Thus, the video processing device is not limited to processing video or film in any particular format, and may accommodate NTSC, PAL and progressive SDTV image streams.

In general, the image data that is transferred between elements comprises a number of fields, and is apportioned into even and odd fields. In one embodiment, data provided from the Codecs has marker codes inserted therein, identifying the end of fields (EOF) and the end of images (EOI). Other marker codes, such as those described in patent application Ser. No. 08/832,987 entitled "Computer System and Process for Capture, Editing and Playback of Motion Video Compressed Using Interframe and Interframe Techniques", filed on Apr. 4, 1997 by Sporer et al., incorporated herein by reference.

Since there are many possible types and formats of data that can be received by a processing element, and since various functions can be performed on the data, a processing element receives control information about the data and function to be performed. The command information should change only on image boundaries. The command information may include, for motion video data, the size of an image, i.e., its spatial resolution; a position of an image, e.g., for a processing element that is a picture-in-picture; brightness; contrast; color correction or other processing information; chroma or luma keys; indications of a blend to be performed; and/or possibly an indication of temporal resolution (i.e., frame rate) of color format. The command information is typically provided by a host computer.

In order for the processor to perform appropriate processing on data fields, a field advance counter is maintained in the raster to block converter to allow the processor to keep track of the number of samples processed by the processing element using the control information. Each time that a field of an image is processed, the field advance counter is decremented. When the field advance counter is equal to zero, the raster to block converter asserts a handshake signal indicating this condition to the frame buffer 78. In response to this signal, logic associated with the frame buffer 78 and in response to a detection of the End Of Image (EOI) marker code in the data stream, logic associated with the frame buffer asserts an interrupt to enable new control information to be loaded for the next image. A delay may occur between when the logic associated with the frame buffer processes the last field in the data stream and when it receives the handshake signal. During this delay period, fill fields of value to 0xFF are inserted into the data stream. During processing, the 0xFF fields are readily identified and stripped prior to processing. Thus, the field advance counter may be used to synchronize data transfer and processing at each of the elements on the video processing device 32.

Processing Datapaths

As mentioned above with regard to FIGS. 1 and 2, the elements included in each of the processing datapaths include the Codecs 72 and 82, the raster to block converters 74 and 84, the resize units 76 and 86 and the frame buffers 78 and 88. Each of the processing datapaths independently control the amount of compression, color correction, gamma correction, brightness, luminance, saturation and motion effects performed on their associated data stream. Typical operations and configurations for each of the elements are described in more detail below.

1. Codecs

In one embodiment, a JPEG codec compresses and decompresses a video data stream according to a Joint Photographer Expert Group (JPEG) protocol. One device which may be used to provide the JPEG codec capabilities is a Zoran ZR36050 JPEG Image Compression Processor, from Zoran, Santa Clara, Calif. However, the present invention is not limited to the use of JPEG compression techniques. Other compression techniques such as MPEG, DVC, Wavelet and lossless compression techniques may also be used.

The codecs are bi-directional devices that operate generally as follows: in one direction, compressed data is received from the host computer over the Codec DMA channels. For example, the JPEG Codecs decompress the video data streams for processing into 8×8 blocks of pixel information using variable length encoding, inverse quantization and Inverse Discrete Cosine Transform (IDCT) techniques known to those of skill in the art. The level of decompression that is applied to the data is selectable by a user. The larger the level of decompression, the larger the output image from the Codec. Larger images take more time for processing, but the resultant image is generally of higher quality. Thus, there is a tradeoff between the processing time and the image quality. The Zoran ZR36050 JPEG Image Compression Processor provide a range of compression levels. Thus, the Codecs provide the flexibility for a user to determine a compression level to be used for processing in both the foreground and background datapaths. In a second direction, uncompressed data, received from a variety of sources via the pixel switch 100, is compressed by the JPEG Codecs using forward DCT, quantization and variable length encoding techniques for storage on the host computer 30. When selecting the amount of compression to apply to the video data, a tradeoff is made between compressed image size and quality.

The Zoran 36050 JPEG Image Compression processor, which is optionally used in the video processing device 32 is programmable to provide a constant data stream output rate. Because frames in a video sequence may have a varying degree of complexity, in order to provide a constant data stream output rate, each of the frames is compressed by a different amount in response to its complexity. Thus, more complex frames, which include more data, are compressed by a larger amount than less complex frames, which include less data.

Typically, the amount of compression to apply to a given field is determined by the complexity of the previous field. Thus, the compression decisions lag behind the field by one field length. Such lag is permissible for streams of video where the frames include the same amount of complexity. However, when there are sharp transitions between frame complexities, it may occur that an undesireably small amount of compression is applied to a complex frame. When too little compression is applied to a complex frame, the resulting compressed frame uses large amounts of memory for storage, and the elasticity of the processing pipeline will be compromised.

In one embodiment, a min scale factor is provided to ensure that compression amounts do not fall below a minimum amount, even for the least complex images. In one embodiment, the min scale factor may be set to 0.5, although this amount would vary depending upon the memory and processing constraints of the video processing card. Providing a minimum scale factor ensures that, even when there are sharp transitions in complexities of adjacent frames, the size of the resulting compressed data frame is manageable.

In FIG. 3, the min scale factor is stored in registers 72a and 82a. Thus, a min scale factor may be provided for each of the processing datapaths. In one embodiment, each of the registers comprises 32 data bits. Bit 0 of each register is an enable bit, used to enable automatic read and compare of the min scale factor value. Bit 1 of each register 72a and 82a enables writes to the min scale factor value on field boundaries. Bits 15:2 are reserved, and Bits 31:16 are used to store the min scale factor.

Accordingly, the use of a min scale factor permits a constant rate output data stream to be provided while maintaining elasticity of the processing pipeline.

2. Raster/Block converters

The raster to block converters 74 and 84 are used to perform a number of different processing functions including raster-to-block and block-to-raster conversion, color collection, chroma, luminance and gamma correction, pass-through (to support lossless compression), horizontal reversal and adding hard colored borders.

As mentioned above, associated with each of the raster to block converters is a SRAM device. The SRAM devices are used as strip buffers. Rather than store an entire frame of image data in a frame buffer, multiple lines, or strips, are stored during the raster-to-block conversion process in the coupled SRAM device. The use of a strip buffer, as opposed to a frame buffer, significantly reduces the required memory and resultant system cost. In one embodiment, the strip buffer stores 32 lines of data and is implemented in either a 32K×8 or 128K×8 static RAM device. The strip buffer SRAM provides a number functions to the raster to block converter. First, the strip buffer SRAM provides a place to store raster lines until eight lines are gathered. Once eight lines are gathered, the process of providing 8×8 blocks of data may be initiated. Second, through appropriate addressing, the strip buffer SRAM may be used to perform the raster to block conversion. Third, the strip buffer SRAM provides buffering to add elasticity to the video pipeline, thereby improving the overall performance of the video processing system.

Figure 7:
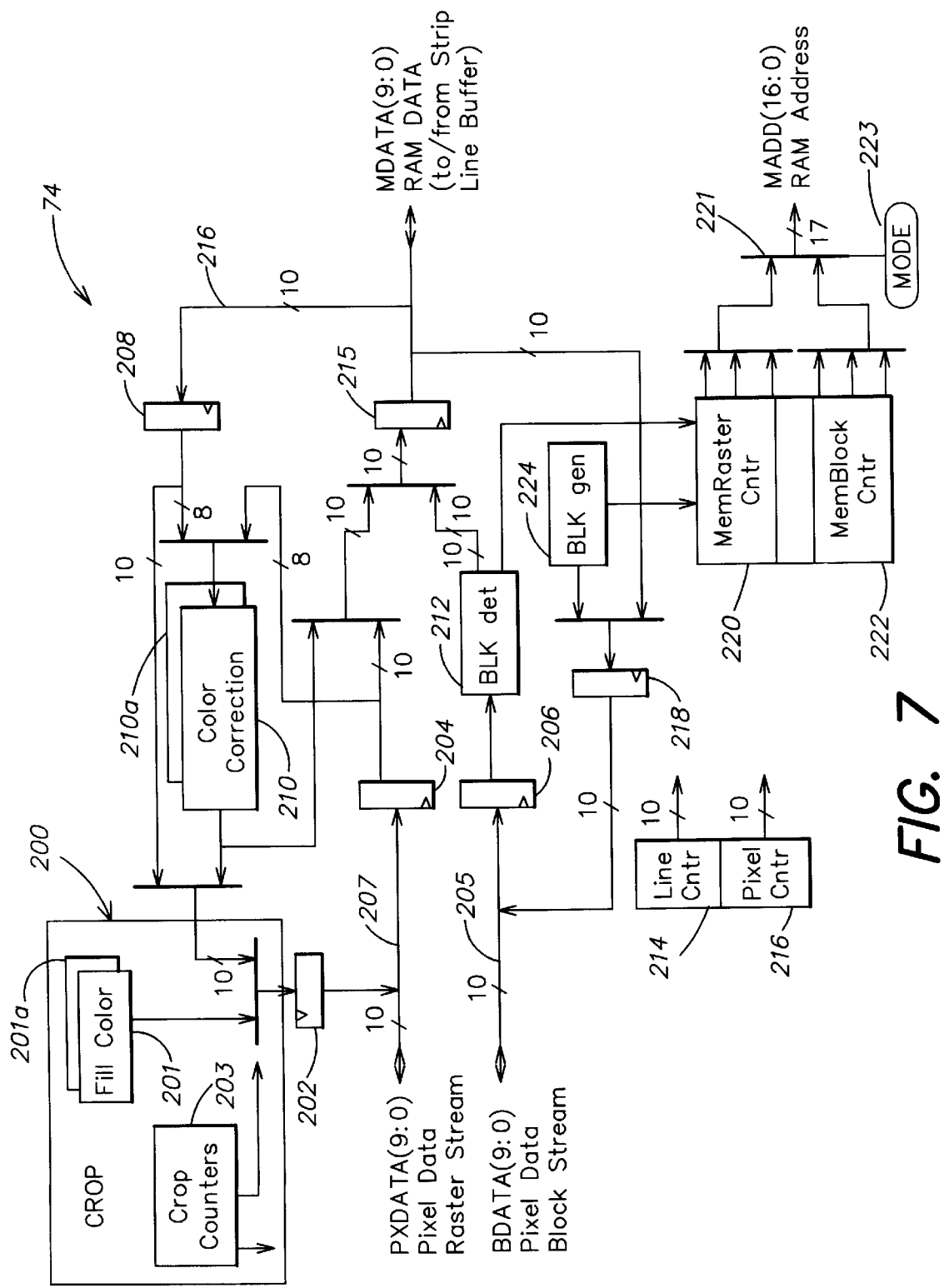
FIG. 7 is a block diagram of one embodiment of image processing logic for use in the video processing device of FIG. 3.

FIG. 7 is a block diagram of one embodiment of the raster to block converter 74. Raster to block converter 84 is identical to raster to block converter 74 and therefore only one will be described in detail. Image data represented in block format is transferred between the Codecs 72 (82) and the raster to block converter 74 on BDATA<9:0> bus 205. Image data represented in pixel format is transferred between the raster to block converter 74 and resize unit 76 on bus 207. In the embodiment of FIG. 7, busses 205 and 207 are shown to comprise ten bits of data. Thus, the raster to block converter 74 is capable of supporting ten bit pixel component data formats. However, other pixel component data formats, such as eight bits, may also be supported. In eight bit format, the most significant bits of the busses 205 and 207 are ignored. A software application may select between eight bit or ten bit format using a software programmable ten bit mode control bit. Thus, the present invention is not limited to any particular bit format of pixel data.

Pixel components received by the raster to block converter in block format on bus 205 are latched by latch 206 and forwarded through BLK detect logic 212. BLK detect logic 212 monitors the number of components that have been received for a block and forwards the components to register 215. The contents of register 215 are output on the MDATA<9:0> bus 216.

BLK detect logic 212 also forwards control signals to MemRaster control 220 MemBlock control 222. MemRaster Control 220 and MemBlock control 222 provide address and control signals for addressing strip buffer SRAM 75. MemRaster control 220 provides address and control signals for storing and retrieving image data in CCIR601 pixel format. MemBlock control 222 provides address and control signals for storing and receiving image data in block format. Select logic 221, controlled by a mode bit 223, selects either the address and control data provided by MemBlock control 222 or the address and control data provided by MemRaster control 220 for writing the data on MDATA<9:0> lines 216 to strip buffer SRAM 75.

In one embodiment, data that is written to strip buffer SRAM in a first format may be retrieved from strip buffer SRAM in a second format. Different addresses are used depending upon the desired received format of data from the strip buffer SRAM. When it is desired to read or write data in pixel format, address and control from the MemRaster control 220 is used. When it is desired to read or write data in block format, address and control from the Mem Block control is used. The strip buffer thus may be used for providing the raster to block conversion. In addition, by providing temporary storage of data, the SRAM adds elasticity to the processing pipeline.

In FIG. 8A, the significance of the address bits to the SRAM when the SRAM is operating in Raster mode is shown. In FIG. 8B, the significance of the address bits to the SRAM when the SRAM is operating in Block mode is shown.

In raster mode, as shown in FIG. 8A, a X(9:0) and Y(6:0) identify raster ordered X and Y addresses; i.e., the (x,y) address of the pixel component within the image. C(1:0) identifies the type of component at the respective address (one of $Cb_n$, $Y_n$, $Cr_n$, $Y_{n+1}$). In block mode, as shown in FIG. 8B, ST(3:0) identifies the number of lines in a strip (for example, eight), MN(5:0) represents the number of blocks within the strip, and MI(5:0) identifies an index of pixel pair (CbYCrY) within the block. For example, in an 8×8 block including 64 pixels MI(2:0) identifies the pixel within the line and MI(5:3) identifies the line within the block. As in raster mode, C(1:0) identifies the type of component at the respective address (one of $Cb_n$, $Y_n$, $Cr_n$, $Y_{n+1}$).

Referring back to FIG. 6, chroma, luminance and gamma correction is performed on data retrieved from the strip buffer SRAM 35 in the data correction unit 210. Cropping and border control is provided in the crop unit 200. The operation of both of these units is described briefly below.

The data correction unit 210 operates generally as follows. Pixel data is represented in the CCIR601 YcrCb 4:2:2 color space. A 2×2 matrix computation is performed in hardware for Chroma correction. Software specified color coefficients (CCs), scale factors (SFs), tint values (Kr, Kb) and Chroma color components Cr and Cb are input parameters that generate a color corrected NewCr and NewCb. The scale factors are used to increase the range of corrections. The tint values allow a color component to be shifted towards a particular color. The color correction operation is performed as indicated in below Equation I:

Equation I $$\begin{bmatrix} NewCr \\ NewCb \end{bmatrix} = \begin{bmatrix} CC_{11} & CC_{12} \\ CC_{21} & CC_{22} \end{bmatrix} \begin{bmatrix} Cr \\ Cb \end{bmatrix} + \begin{bmatrix} Kr \\ Kb \end{bmatrix}$$

The resulting color corrected equations are shown in Equation II:

Equation II $$NewCr=((CC11*Cr)*Sf11)+((CC12*Cb)*SF12)+Kr$$

$$NewCb=((CC21*Cr)*SF12)+((CC22*Cb)*SF22)+Kb$$

Values for the chroma coefficients (CC11, CC12, CC21 and CC22), tint coefficients (Kr, Kb) and scale factors (SF11, SF12, SF21, SF22) are stored in software programmable registers. In one embodiment, the registers are shadowed such that the host computer may update the coefficients for processing a next frame in a sequence while processing is being performed using the current coefficient values.

Figure 9:
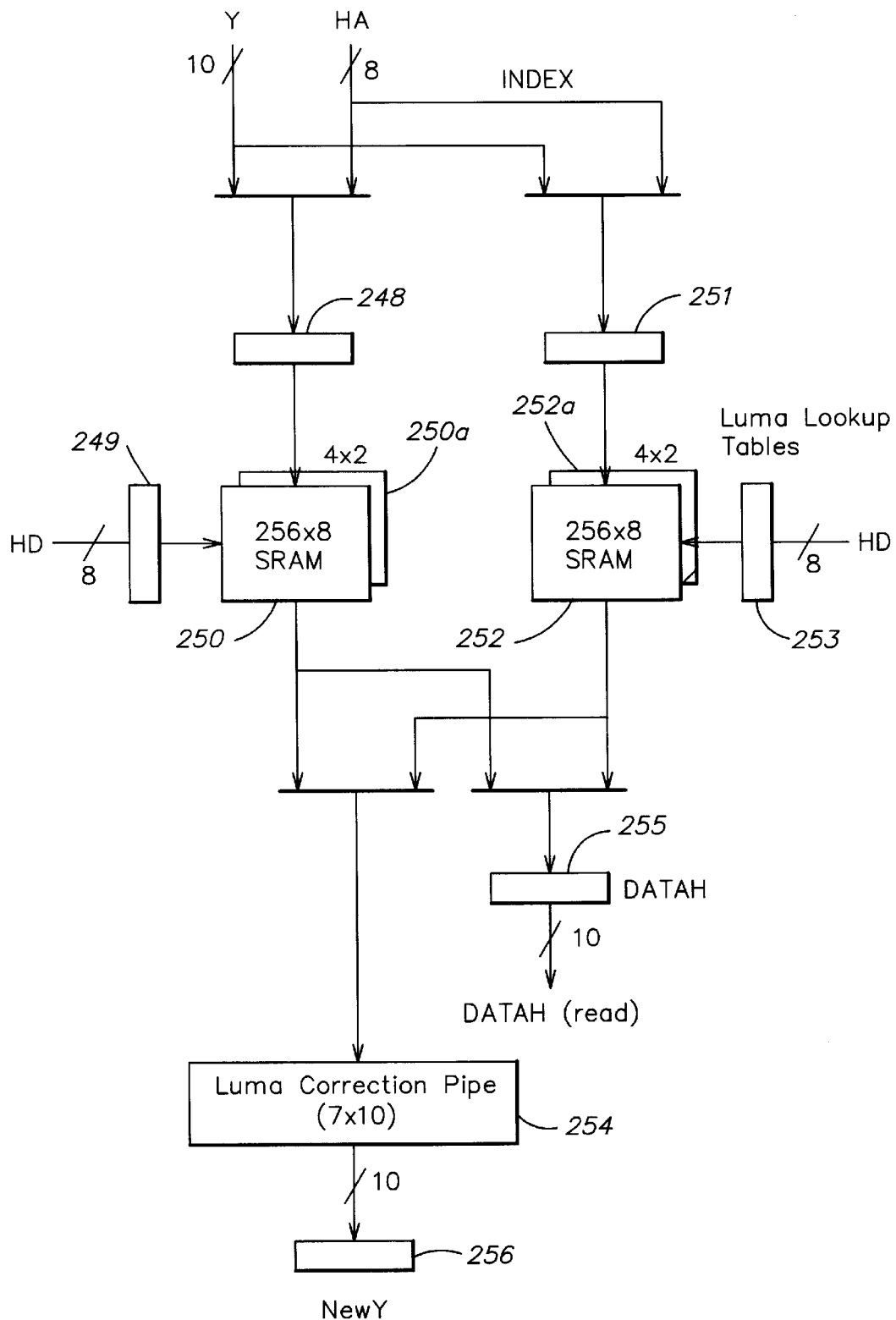
FIG. 9 is a block diagram of one embodiment of luminance correction logic for use in the video processing device of FIG. 3.

FIG. 9 illustrates an example of a datapath included in the correction unit 210 for correcting luminance data. A double buffered hardware lookup table includes two static RAM devices 250 and 252. The static RAM devices 250 and 252 are written via a program executed on the host computer system 30 using the HA address lines and HD data lines. During operation, a brightness, contrast correction and other luma effects are provided in response to a value of an input Y component. An adjusted Y component is output from the static RAM devices. The adjusted Y component is written to software accessible register 255. The adjusted Y component also is forwarded to the luma correction pipe 254 which manages the flow of the luma data into the video data stream.

In one embodiment, at any given time during operation, one of the two static RAM devices is active and the other one of the two static RAM devices is inactive. Luma table lookups are made against the active table. Luma table control read and write operations are made to the inactive table. In one embodiment, hardware switches between the tables on field boundaries if the current inactive table has changed since the start of a current field. A status bit is maintained to indicate which of the tables is determined to the the active table. A mode register bit may be provided to force one of the tables to be the active table.

Advantageously, each of the two static RAM devices 250 and 252 includes an associated shadowed SRAM 250a and 252a respectively. Shadowing the SRAM devices permits the host computer to change brightness, contrast or luminance mappings for later frame processing while continuing to process current frames using the existing SRAM mappings.

Referring back to FIG. 7, crop logic 200 includes fill color registers 201 (which are shadowed with fill color registers 201a), and crop count logic 203. The fill color register stores color values for Y, Cr and Cb components and identify the colors of those components when used to border an image. The crop count logic 203 includes four registers to define a position and size of the cropped image and four registers to define how far into the cropped image the border color extends. The area of an original image that is cropped is defined by the contents of the crop registers. When a border is used, the border is cut into the cropped image, replacing image data values with that of the selected color. The four registers that define the position and shape of the image include: XleftPosCrop, identifying a position of left edge of a cropped image within the full image, YtopPosCrop, identifying a position of the top edge of a cropped image, XrightPosCrop, identifying a position of a right edge of the cropped image, and YbottomPosCrop, identifying a position of the bottom edge of the cropped image.

The four registers that define how far into the cropped image the border extends are XleftPosBorder, identifying a position of the left inside edge of a border within the full image, YtopPobBorder, identifying a top inside edge of the border, XrightAPosBorder, identifying a position of a right inside edge of the border, and YbottomPosBorder, identifying a position of a bottom inside edge of the border.

Thus, the raster to block converter provides includes conversion and color correction capabilities. Once image data has been processed by the raster to block converter, it is passed to the resize 76.

3. Resize Unit

The resize units 76 and 86 operate to resize the received data steam to support conversions from 640 to 720 pixel lines, conversion from low resolution media (320 or 352 pixels) to 720 pixel lines, and fixup resizing (scaling up). The resize units 76 and 86 may also be used to scale down image raster data to support picture-in-picture applications. For process, the resizer is intended to support reducing the number of pixels per line, and to scale a full frame down vertically for single field film resolutions. Control over the functionality of the resizer is provided by software accessible registers. In one embodiment, a Genesis gm833x2 Image Resizing Engine, provided by Genesis Systems.

4. Frame Buffers

Each of the frame buffers 78 and 88 is each used to hold one entire frame of pixel data. In one embodiment, the frame buffers provide field/frame conversion, still frame, slow motion effects, slow speed scrub, 2:3, 3:2 or PAL pull down (playback), single field play, undoing 2:3, 3:2 or PAL pull down and pipeline elasticity.

Figure 10:
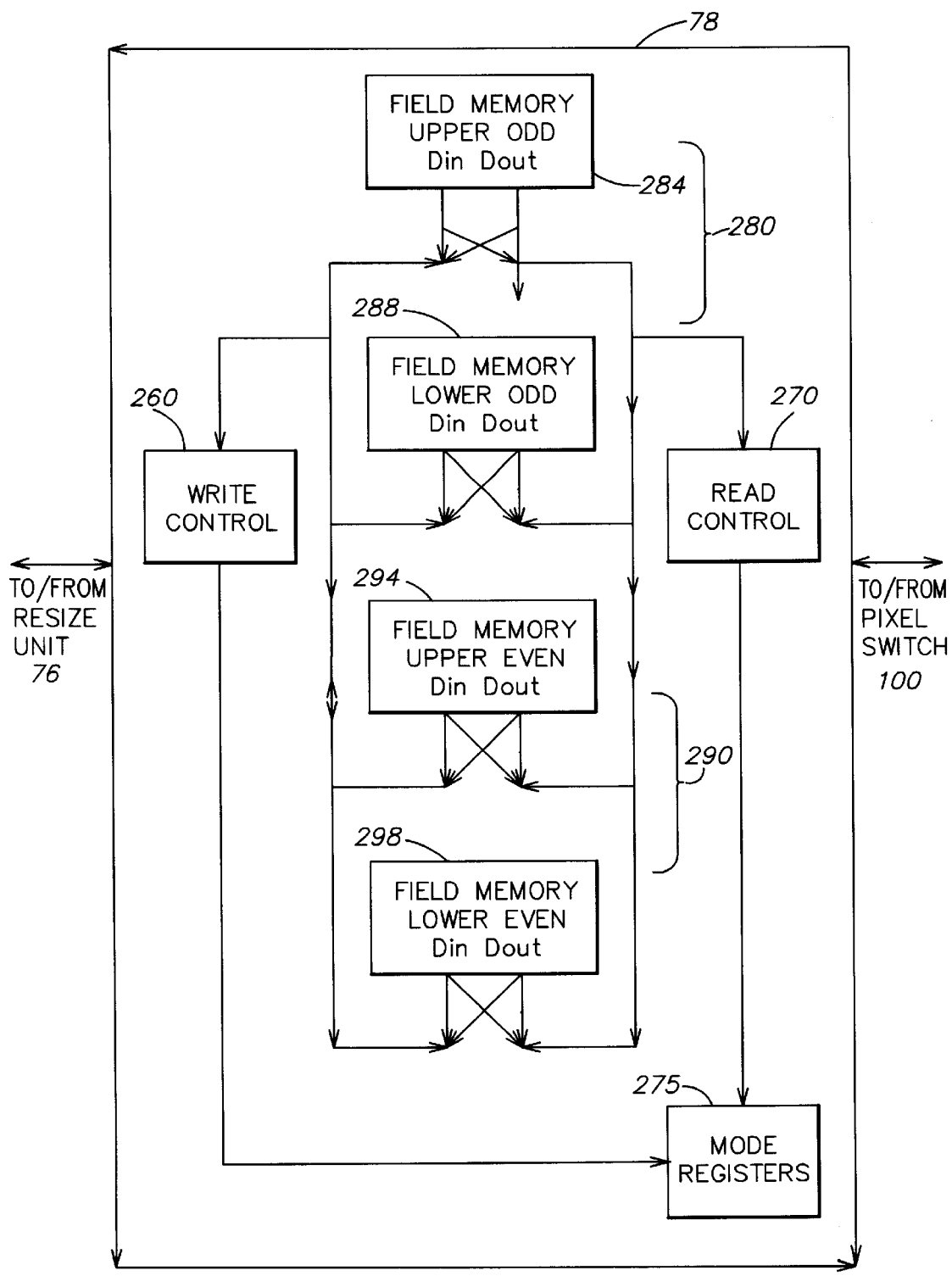
FIG. 10 is a block diagram illustrating an organization of a frame buffer memory employed in the video processing device of FIG. 3.

Referring now to FIG. 10, a block diagram of one embodiment of a frame buffer memory 78 is shown. The frame buffer memory 78 is apportioned into upper and lower portions 280 and 282 respectively, with the lower portion 282 storing 128 lines of a frame, and the upper portion 280 storing the remaining lines of a frame. Each of the upper and lower portions are further apportioned into even and odd field memories 284, 288 and 294, 298, respectively.

Video is typically apportioned into a number of frames, where each frame includes an even and an odd field. As mentioned above, the video processing card is capable of operating using either progressive or interlaced images. A progressive image is transmitted using a series of frames of even and odd fields. One example of progressive video is progressive SDTV. An interlaced image is transmitted by first transmitting all of the odd lines of the field, then all of the even lines of the field. On example of interlaced video data is NTSC interlaced video.

As mentioned above, the video processing device is capable of operating using either progressive or interlaced video data. Generally, however, compression is performed on the data in progressive format since this provides the largest amount of compression. The frame buffer includes logic for translating the progressive video to interlaced video for display, if it is interlaced video.

When interlaced data is received at the frame buffer, odd fields are stored in odd portion 280 frame buffer memory 78, while even fields are stored in the even portion 290 of frame buffer memory 78. Reads and writes to/from the frame buffer memory 78 are interleaved between the even and odd portions of memory. Thus, in basic operation mode, the frame buffer accesses alternate between the even and odd portions of frame buffer memory 78. Write control logic 260 provides address, control and data signals for writing frame buffer memory 78, while read control logic 270 provides address, control and data signals for reading frame buffer memory. A mode register 275 stores a number of control bits that are used to control a mode of operation of the frame buffer.

If the type of video data is the type that is displayed in progressive format, the reordering performed by the frame buffer need not be performed. Rather, fields are written directly to the frame buffer in the order in which they are received.

For displaying interlaced data, write data that is received from the resize unit 76 of buffer memory in progressive format, is read out of the frame buffer memory for forwarding to the pixel switch 100 in interlaced format. Alternatively, write data that is received at the frame buffer in interlaced format is read from the frame buffer in progressive format for recording. The frame buffer memory may therefore be used to convert between progressive and interlaced data.

Figure 11:
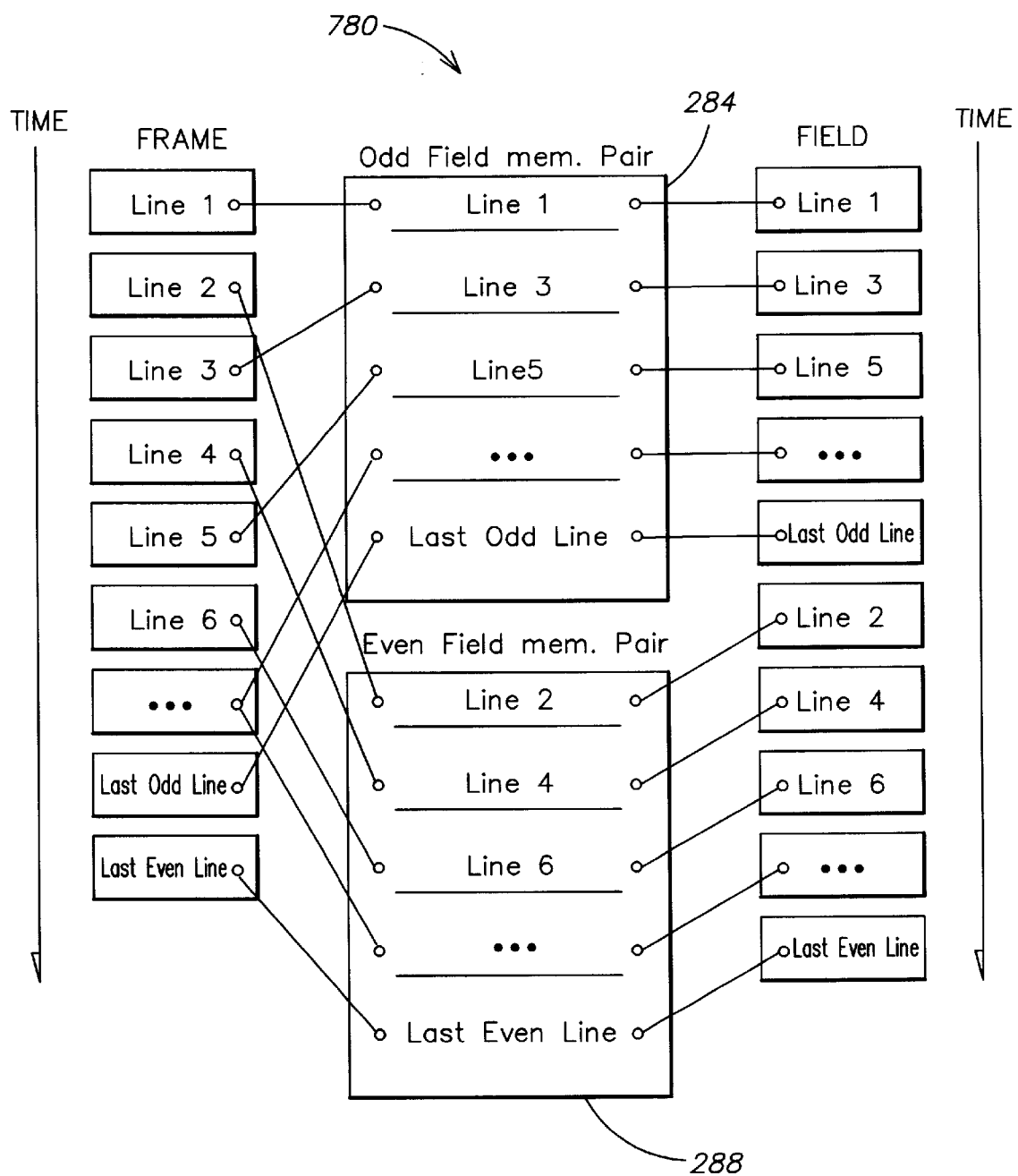
FIG. 11 is a graphical illustration of the translation of image data from frame to field format by the frame buffer memory of FIG. 10.

FIG. 11 illustrates a graphical representation of the conversion of an input data stream from progressive format to interlaced format. Reads from frame buffer memory are delayed by one pair of line writes. For example, Lines 1 and 2 would be written to Even field memories 288 and 284. When Line 3 is written to Even field memory 288, Line 1 would be read from frame buffer memory.

Typical video processing systems provide slow motion, still frame and 2:3 pull down effects by controlling a rate of flow of frame buffer to a display, for example by changing a rate of transmission of pixels to a RAMDAC, or by changing the rate that pixels are forwarded from the RAMDAC to the display. In the embodiment of FIG. 9, rather than change a rate at which data is output to the display, slow motion, still frame and 2:3/3:2 pull down effects are provided by controlling the content of the fields that are input to the frame buffer memory. For example, in order to provide a still image effect the same frame is written numerous times to sequential locations of the frame buffer. When the contents of the frame buffer are forwarded to the display, the same frame is constantly output from the different locations in frame buffer memory. The resulting image is the desired still image effect.

Mode bits in the mode register 275 are used to control which fields are written to frame buffer memory 78 and therefore are used to provide still image, 2:3 pull down and slow motion effects. The mode bits include a Hold Content (HC) bit, a Suppress Switch (SS) bit and a Film Swap (SW) bit.

When the Hold Content (HC) bit is set, data on the write datapath to the frame buffer memory is held stable for the duration of time that the hold bit is set, and no more writes to the frame buffer are performed. In this manner, the HC bit may be used to provide still image effects.

The Suppress Switch (SS) bit is set to stop the frame buffer controller from switching between odd and even portions of frame buffer memory. When the SS bit is set, sequential fields that are input on the datapath to the frame buffer memory are written to the same portion of frame buffer memory. The SS bit may be used in conjunction with the HC bit to replay an odd or even field in playback mode.

The Film Swap (SW) bit is set to swap the order of writing of the next pair of fields after the SW bit is set. For example, assume a frame C having components C0 and C1 follows a frame B and, according to the conventional operation of frame buffer memory C0 is to be written to an even portion of frame buffer memory, and C1 is to be written to an odd portion of frame buffer memory. If the SW bit is set during frame B, the effect is that component C0 is written to the odd portion of frame buffer memory, while component C1 is written to the even portion of frame buffer memory. The SW bit may be used in conjunction with the HC bit to provide 2:3 and 3:2 pull down and motion effects.

Referring now to FIGS. 12A–12H, a series of timing diagrams are provided for illustrating how the above described mode bits may be used to achieve still image, slow motion, and 2:3/3:2 pull down effects. In the diagram, time increases in direction from left to right, and each cycle is identified by Tn. Frames destined for the odd portion of frame buffer memory are indicated by $O_n$, while writes to the even portion of frame buffer memory are indicated by $E_n$. Input frames are indicated by Fn. In each of the timing diagrams, fields 300 indicate the fields that are received on an input datapath for writing to the frame buffer, the fields out 310 indicate the resulting fields that are provided as read data when the frame buffer is accessed for a read.

FIG. 12A illustrates how the HC bit may be used to provide freeze frame effects. At time T3, the HC bit is asserted during the input of field E2. The effect is to hold the content of the E2 at the write port to the frame buffer memory. When the contents of the frame buffer memory are read out, as shown in 310, the E2 and O2 fields are repeated from time T2 through T7.

FIG. 12B illustrates how the HC and SS bits may be used together to replay an odd field in playback mode. During writing, at time T2, the HC bit is set, causing the contents of the write datapath to be held for one cycle. During playback, at time T3, the SS bit is set, causing the switch to the even portion of frame buffer memory to be suppressed. The result is that the contents of the write datapath are repeatedly written to the odd portion of frame buffer memory and a sequence of odd FIG. 12C illustrates how the HC bit may be used to freeze frame two fields. During cycle T2 and T3, the HC bit is set. As a result, the data from F2 is repeatedly stored in the frame buffer memory and output on playback.

FIG. 12D illustrates how the HC and SS bits may be used in playback mode to repeat an odd field. At time T2 and T3, the HC bit is set. At time T3, the SS bit is set. As a result, the playback data is retrieved from the odd portion of frame buffer memory.

FIGS. 12E–12H illustrate how the bits may be used to provide film effects. Frames of received film data are represented as A,B,C and D. The HC and SW bits are asserted at appropriate times during the transmission of the NTSC bit stream to achieve the desired 2:3 or 3:2 pull down field sequence. FIG. 12E illustrates the setting of mode bits to achieve 2:3 pull down, while FIG. 12F illustrates the setting of bits to implement 3:2 pull down.

For 2:3 pull down, the SW is set or cleared during every B type or D type frame. As described above, when set it indicates that the subsequent fields (in this case C and D) should be played in reverse; that is, the even field first followed by the odd field. The SW bit is set based on which field of the next film frame is played out first: 0=odd, 1=even. Thus, in FIG. 12E, the SW bit is set on frame B to play out frame C in reverse (even field first). As shown in FIG. 12F, to provide 3:2 pull down, the HC bit is set for each A and B type frame, while the SW bit is set for each A type frame, and reset for each C type frame. The above concepts may be readily applied by one of skill in the art for providing PAL pull down.

It is also possible to perform motion effects on film based material using the above control bits. FIG. 12G illustrates one example of a motion effect at half speed. In the half speed effect, the A film occupies both the A type frame and B type frame when it is played back. Thus, at full speed, the B type frame would be initiate play at T4 rather than at 16. FIG. 12H illustrates a motion effect at one third speed. To achieve this effect, the A type frame occupies the A, B and C type frames being played out. Thus, the B type frame does not begin playing until time T8.

The frame buffer thus provides frame/field conversion and motion effects capabilities. As shown FIGS. 1 and 2, a separate frame buffer is provided in both the foreground and background data streams. Accordingly, motion effects may be independently applied to each of the data streams using the above techniques. Such an arrangement provides increased effect capability to the video processing system.

Accordingly, a number of elements that may be included in the processing datapath, and their associated functionalities, have been described. However, the present invention is not limited to a datapath including these components. Other components may be added to the datapath in order to provide different types of functionality that are to be provided on the video processing device. In addition, although the datapaths have been shown including identical elements, this is not a limitation of the present invention. Rather, different processing abilities may be provided on the different datapaths and the pixel switch may be configured to use the desired processing datapaths to obtain the desired functionality.

Rolling and Crawling of Titles

Figure 13:
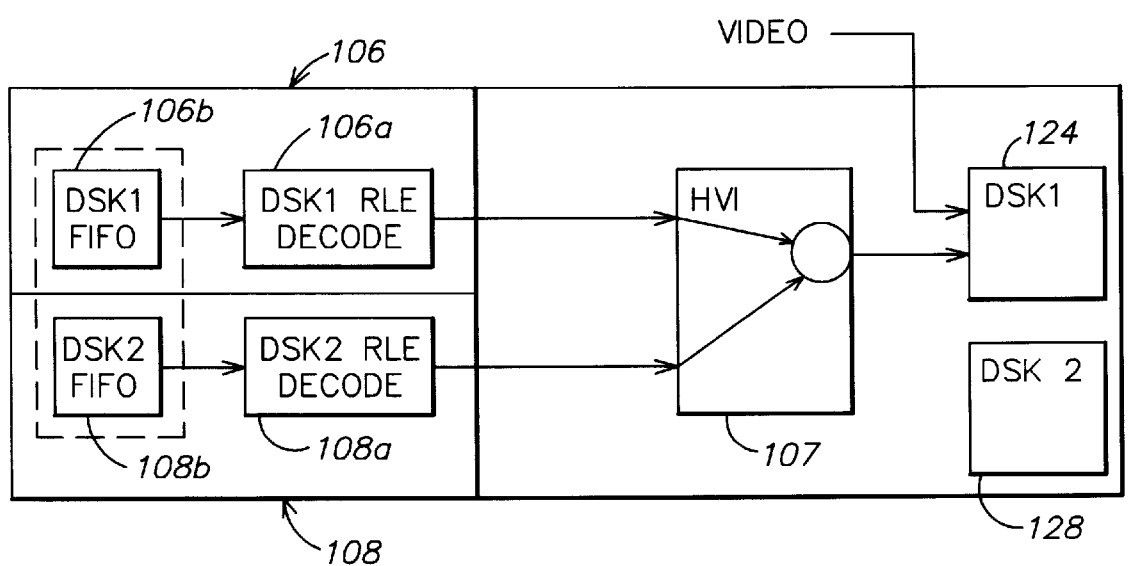
FIG. 13 is a block diagram of a horizontal to vertical interpolator for providing rolling and crawling of titles in the video processing devices of FIG. 3.

Referring now to FIG. 13, as mentioned above, the DSK1 and DSK2 DMA channels 106 and 108 provide smooth rolling and crawling of title functionality. A title is a three track effect; two new tracks are provided over a reference video track. In a three track composition, track zero is the background video, track one is the fill, and track two is the α channel. The effect is that the fill is applied over the background video, using the α channel as a transparency factor.

There are three types of downstream key title effects: rolls, crawls, and static titles. Each of these title effects involves moving the title by sub pixel granularities in adjacent lines on the display. In one embodiment a horizontal/vertical interpolator (HVI) 107 is used to provide smooth rolling titles. The HVI receives two input data streams. The first stream is from the DSK1 DMA channel 106 and the second data stream is from the DSK2 DMA channel 108. Each of the two channels provides scan lane information, with one of the channels providing even scan lines and the other channel providing odd scan lines of the desired title. The output from the HVI 107 is forwarded to the DSK1 mixer 124.

In one embodiment, each of the DSK1 and DSK2 DMA channels includes a run length encoding (RLE) decode block 106a and 108a, respectively. The RLE decode blocks 106a and 108a are used to decode data, received from the host computer 30 or local memory 142 and stored in the respective DSK1 and DSK2 FIFOs in an encoded format. One method of encoding the data streams is described in patent application, attorney docket no. A0521/7148, filed Apr. 3, 1998, and entitled, "Method and Apparatus for Encoding and Decoding a Data Stream Using Inferential Techniques."

The HVI interpolates the color and alpha data received from the DSK1 and DSK2 channels and presents it to the DSK1 mixer 124 to perform the keying. In one embodiment, the output from the DSK1 and DSK2 channels comprises the title information pre-blended with their respective α component. Accordingly, the background data stream is blended with the interpolated title using a half α mix according to below Equation I:

Equation I $$C' = C * c$$

$$R = C' + BG * (1-c)$$

where C represents the incoming video data stream from the DSK1 and DSK2 channels that has been interpolated by the HVI, C' represents C blended with the α component c, and R is the blended composite pixel value. The above blending Equation I may be modified to fade the title up and down by multiplying the alpha c by a constant fade value d. The mixer equation is provided below as Equation II:

Equation II $$e = c * d$$

$$R = C * e + BG * (1-e)$$

where e is the faded alpha value, and R is the mixed composite value.

Therefore, a method and apparatus has been shown that allows for rolling and crawling of titles. By interpolating data received from two data channels, each of which provide either odd or an even scan lines, the simulation of sub-pixel movement in a title may be achieved.

Uncompressed Video

The embodiment of the video processing device described with regard to FIG. 3 may use uncompressed video data at different stages of processing. For example, the configurations of the pixel switch 100 shown in FIGS. 6M through 6T use uncompressed video for composite layering effects. However, during processing, the video data is always forwarded through the Codecs 72 and 82. The compression/decompression process performed by the Codecs 72 and 82 may lead to loss in image quality.

Figure 14A:
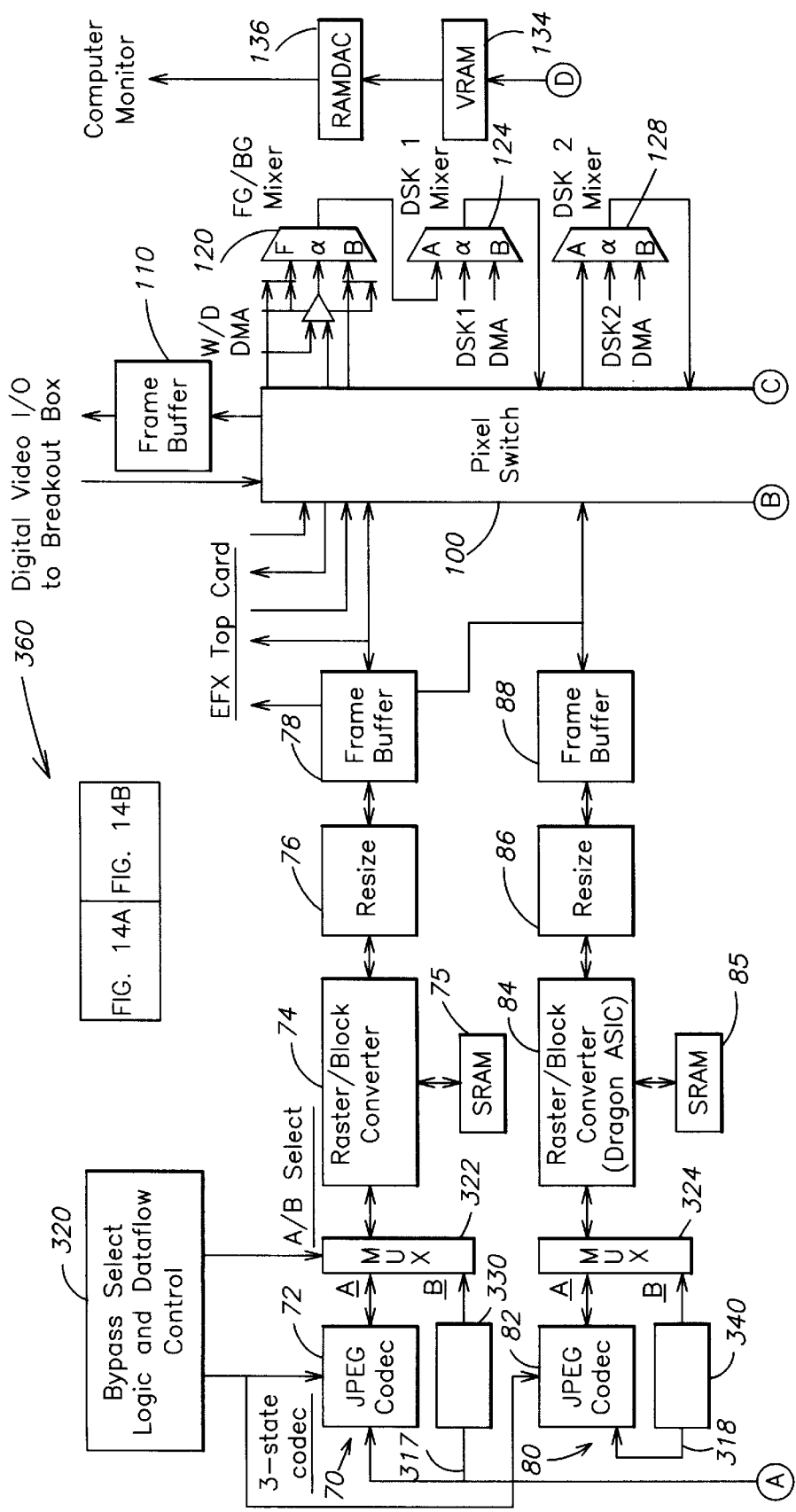
FIG. 14 is a block diagram of a second embodiment of a video processing device capable of performing processing on a stream of uncompressed image data.
Figure 14B:
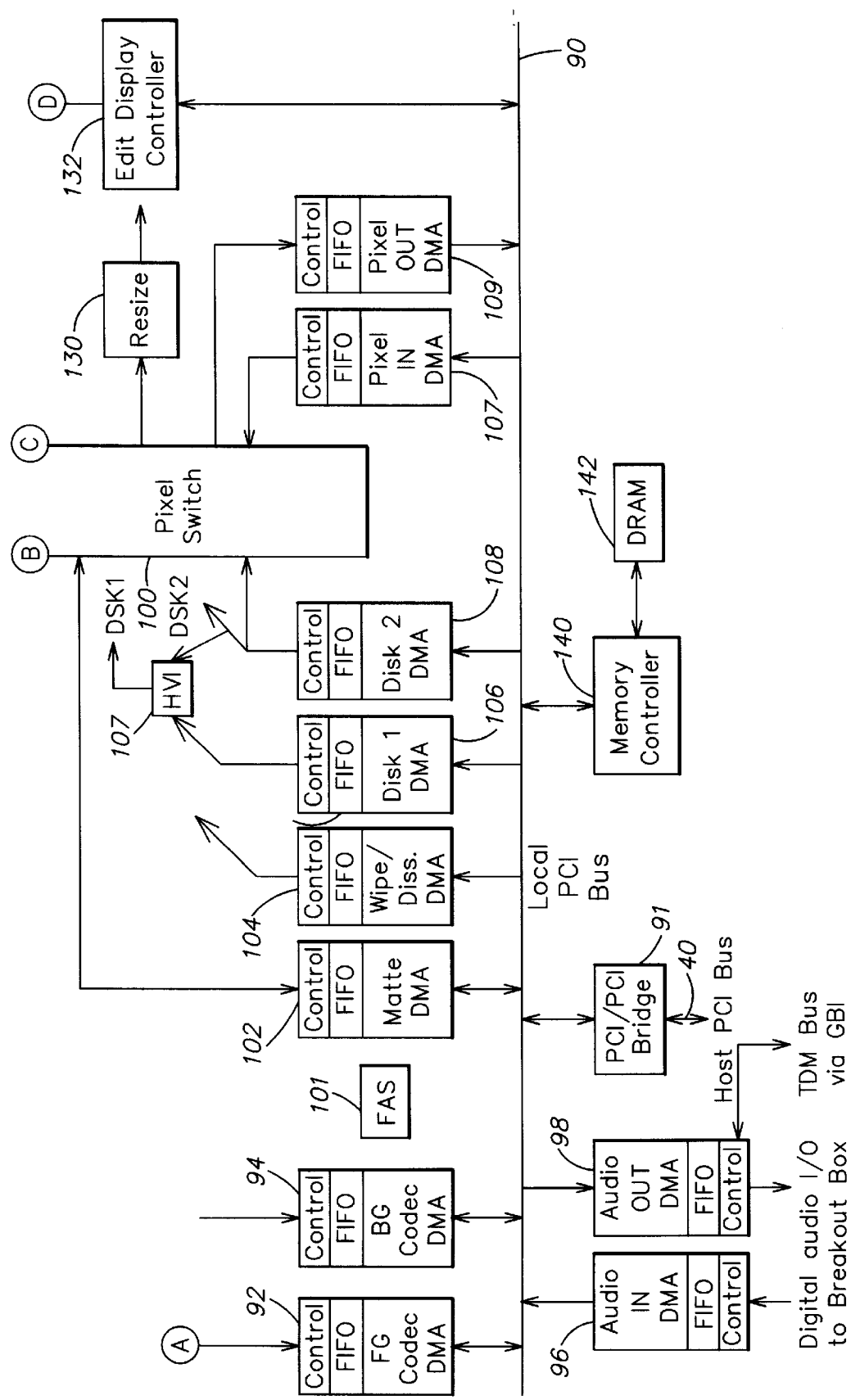

Referring now to FIG. 14, one embodiment of a video processing device 360 capable of receiving and processing uncompressed video data is shown. The video processing device 360 includes elements similar to those in video processing device 32, described above. However, the video processing device 360 includes datapaths 317 and 318 for transferring uncompressed video directly into the processing datapath. The Codecs 72 and 82 are bypassed using bypass select logic and dataflow control 320 when the video processing device is programmed to operate in uncompressed mode. In one embodiment, a software accessible mode bit for setting the video processing device 360 to operate in uncompressed mode is provided in the control 320. The bypass select and dataflow control logic 320 controls the select inputs of multiplexers 322 and 324. The output from multiplexers 322 and 324 is an uncompressed video data stream.

Using uncompressed data introduces two problems: first, the uncompressed data is not in the expected CCIR601 format (rather it is in lossless Y0 Y1 Cb Cr format) and second, the uncompressed data does not include any EOF or EOI marker codes. Accordingly, uncompress logic 330 and 340 is provided in the process datapath between the raster to block converter and the resize unit 76. The uncompress logic 330 and 340 operates to rearrange the order of components in the data stream depending upon whether the uncompressed data is being processed or played back. In addition, the uncompress logic 330 and 340 either adds or removes marker codes from the data stream depending upon whether the uncompressed data is being processed or played back.

Figure 15:
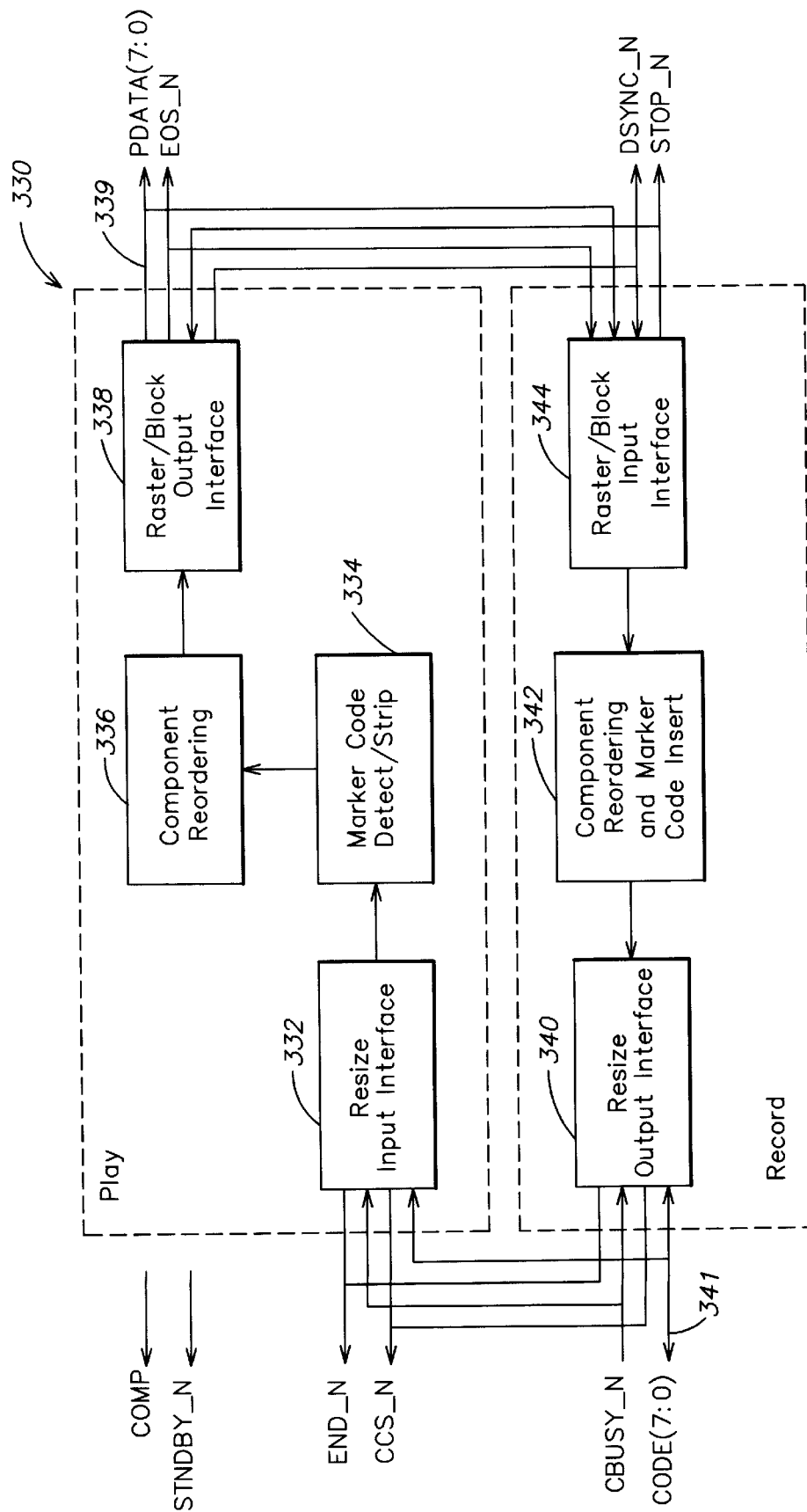
FIG. 15 is a block diagram of logic provided in the video process device of FIG. 14 to support uncompressed image data.
Figure 16:
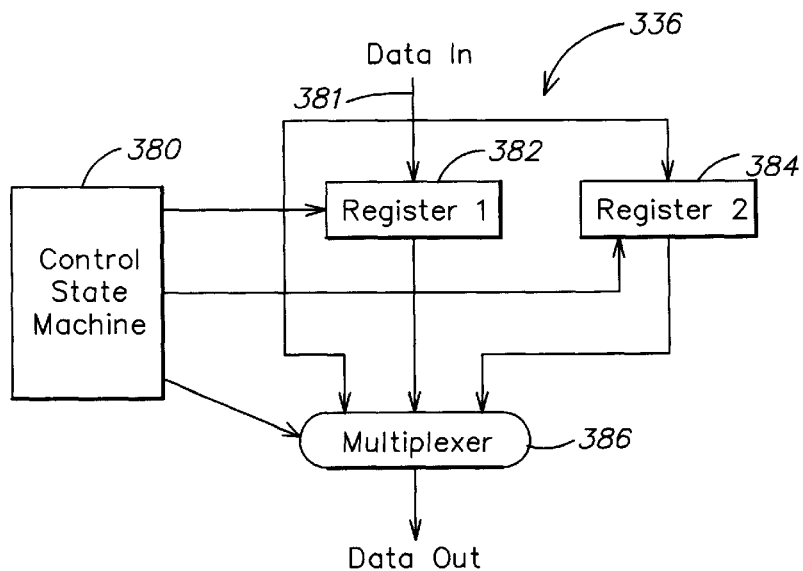
FIG. 16 is a block diagram of control logic for re-ordering components in a data stream in the video processing device of FIG. 14.

FIG. 15 is a block diagram of one embodiment of uncompress logic 330. Uncompress logic 330 includes an input interface 332 and output interface 340 to resize unit 76. The interfaces control the assertion of the flow controlled handshake signals END_N and CCS_N in response to the handshake signal CBUSY_N. The interfaces also transmit and receive data on CODE<7:0> bus 341. Uncompress logic 330 also includes input 344 and output 338 interfaces to the raster to block converter 74. The input interface controls the assertion of signals EOS_N, STOP_N and DSYNC_N. Data is exchanged between the raster to block converter 74 and the uncompress logic 330 via PDATA<7:0> bus 339.

Included in the uncompress logic is a marker code detect/strip unit 334 and a component reordering unit 336. The marker code detect/strip unit 334 receives an image data stream including marker codes from the resize unit 76 during playback. According to one embodiment, because fill field values of 0xFF are only inserted before marker codes, the marker code detect/strip unit simply searches the data stream for series of 0xFF fields. When the 0xFF fields are encountered, they are removed from the data stream. When the last 0xFF field has been stripped from the data stream, it is certain that the next following field is a marker code, and it removes the marker code from the data stream.

The component reordering unit 336 reorders the stripped data stream from CCIR601 order to lossless JPEG Y0 Y1 Cb Cr order. One embodiment of hardware for implementing the component re-ordering is illustrated in FIG. 15. FIG. 15 includes a control state machine 380, coupled to control the loading of registers 382 and 384. A component data stream is received on line 381 from the resize unit 76. The data stream is forwarded to register 382, register 384 and directly to multiplexer 386. The control state machine selects one of the inputs of the multiplexer 386 to pass as the output data. The operation of the control state machine may be implemented according to Table I below:

| Incoming | Outgoing | Register 1 | Register 2 | Available | Current State |
|---|---|---|---|---|---|
| Cb0 | | empty | empty | none | CB2_CB0 |
| Y0 | | Cb0 | empty | none | Y2_CR0 |
| Cr0 | Y0 | Cb0 | Y0 | Y0 | CR0_C0 |
| Y1 | Y1 | Cb0 | Cr0 | Y1, Cb0, Cr0 | Y1_Y1 |
| Cb2 | Cb0 | CB0 | Cr0 | Cb0, Cr0 | CB2_CB0 |
| Y2 | Cr0 | Cb2 | Cr0 | Cr0 | Y2_CR0 |
| Cr2 | Y2 | Cb2 | Y2 | Y2 | CR0_Y0 |
| Y3 | Y3 | Cb2 | Cr2 | Y3, Cb2, Cr2 | Y1_Y1 |
| Cb4 | Cb2 | Cb2 | Cr2 | Cb2, Cr2 | CB2_CB0 |
| Y4 | Cr2 | Cb4 | Cr2 | Cr2 | Y2_Cr0 |

At the end of operation, the control state machine drains any components remaining in the registers.

Also included in the uncompress logic 330 is component reordering and marker code insert unit 342. Marker codes are inserted as follows. The raster to block output interface 338 detects when the last pixel in a field has been processed, and asserts the EOS_N signal. The signal is passed to the interface 344, which converts the signal into an EOI marker code and inserts the marker code into the data stream.

The component reordering portion of unit 342 converts a data stream from lossless JPEG format to CCIR610 format using hardware similar to that provided in FIG. 15. The control state machine 380 operates according to a control protocol set forth below in Table II:

TABLE II

| Incoming | Outgoing | Register 1 | Register 2 | Current State |
|---|---|---|---|---|
| Y0 |  | empty | empty | Y2_CR0 |
| Y1 |  | Y0 | empty | Y3_Y1 |
| Cb0 | Cb0 | Y0 | Y1 | CB0_CB0 |
| Cr0 | Y0 | Y0 | Y1 | CR0_Y0 |
| Y2 | Cr0 | Cr0 | Y1 | Y2_CR0 |
| Y3 | Y1 | Y2 | Y1 | Y3_Y1 |
| Cb2 | Cb2 | Y2 | Y3 | CB0_Cb0 |
| Cr2 | Y2 | Y2 | Y3 | CR0_Y0 |
| Y4 | Cr2 | Cr2 | Y3 | Y2_CR0 |
| Y5 | Y3 | Y4 | Y3 | Y3_Y1 |

Figure 17:
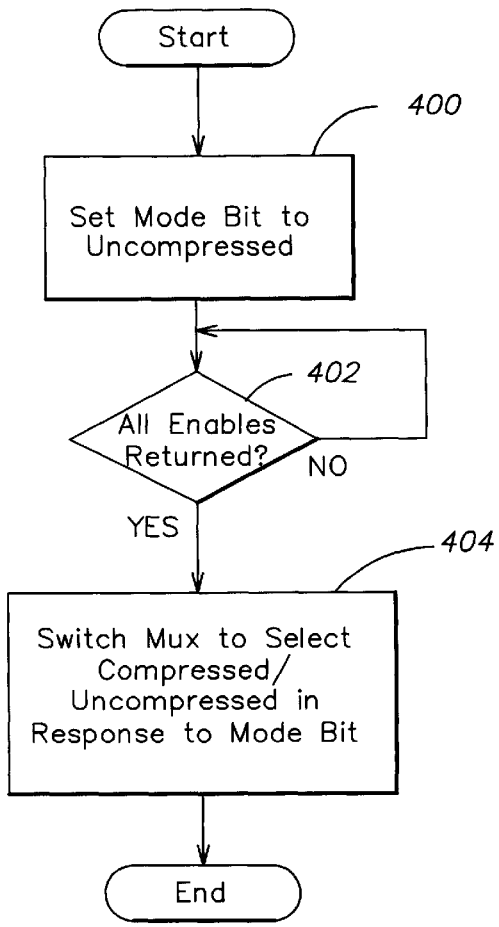
FIG. 17 is a flow diagram illustrating a method of switching between processing compressed data streams and processing uncompressed data streams in the video processing device of FIG. 13.

If the video processing device 32 is operating in compressed mode, the uncompressed logic 330 is bypassed. FIG. 17 illustrates one embodiment of a method for alternating between processing using compressed and uncompressed data in the processing pipelines of FIG. 14. At step 400, while an image is being processed, the uncompressed bit is set to change the mode of processing from compressed to uncompressed (or visa versa). The bit is not checked until all enables are returned from the pipeline to the FAS 101. When it is determined at step 402 that all enables have been returned, then at step 404 the select for the multiplexers 322, 324, 331 and 341 are set to enable the desired data flow.

As described above with regard to the video processing device 32 of FIG. 3, the video processing device 360 functions in a number of operative modes. In a playback mode, uncompressed data, received from the host computer or local memory 142, is forwarded through DMA channels 92 and 94 through the processing pipelines 70 and 80 to the pixel switch 100. The pixel switch 100 may be configured to forward the played back data to any of the output ports as shown in FIGS. 6A–6V. In particular, in a rendering mode, uncompressed data may be blended with special effects from the coupled special effects devices, with intermediate results forwarded to the PixOUTDMA channel 109 for storage on host computer 30 or local memory 142. As the uncompressed data is needed for rendering, it may be retrieved from the host computer 30 or local memory 142 using flow controlled DMA techniques. Controlling the flow of uncompressed data through the processing pipeline using the flow control techniques reduces the memory bandwidth requirements, thereby casing the demands placed on the memory bus for transfer of the large amount of uncompressed data and permitting real time rendering of uncompressed data to be achieved. In record mode, the uncompressed data may be forwarded either from the PixDMAIn channel or from the DSK2 input port to either of the processing pipelines. Data passes through the FGCODEC and BGCODEC channels 92 and 94 to the host computer 30 or the local memory 142.

Figure 18A:
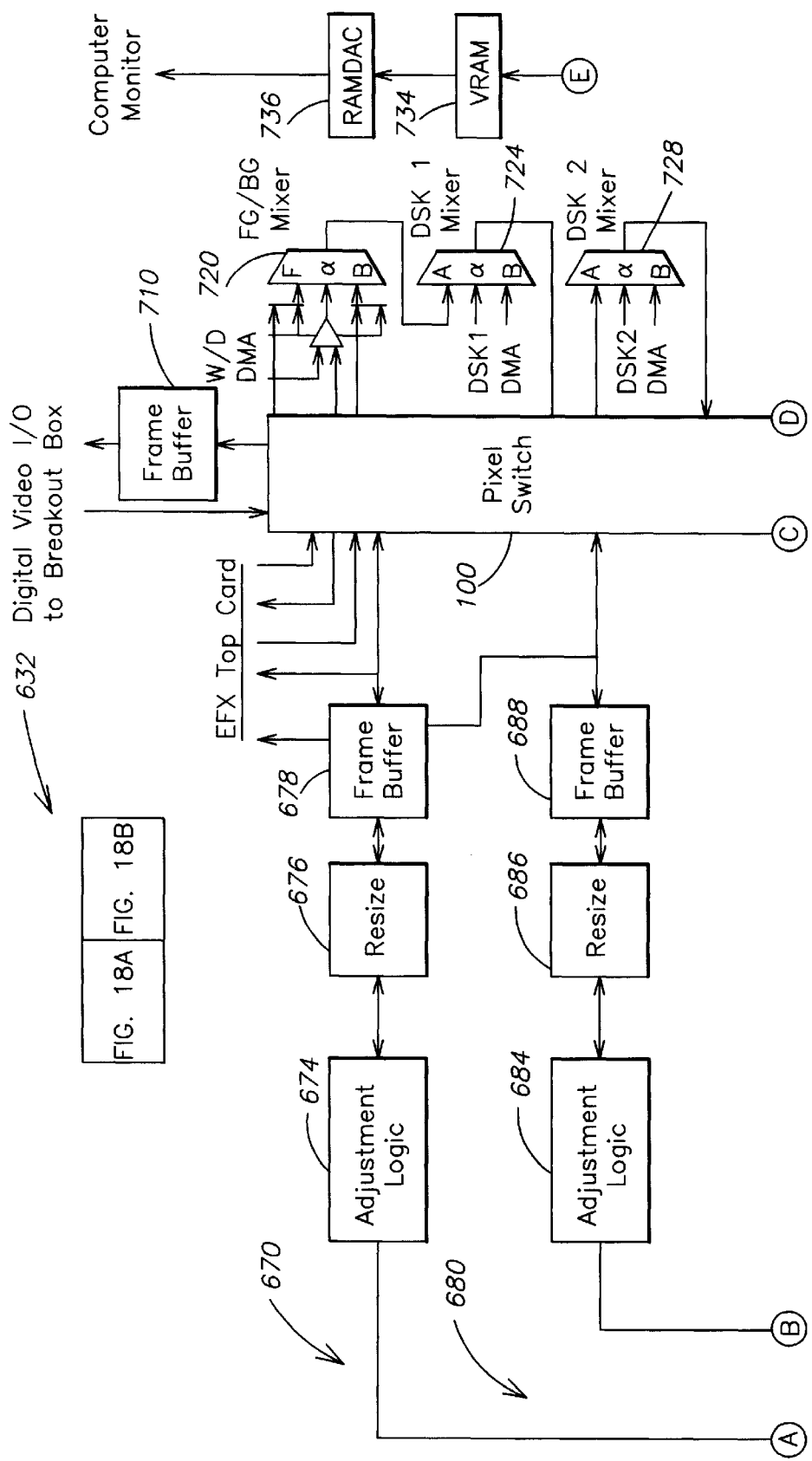
FIG. 18 is a block diagram of a second embodiment of a video processing device capable of performing processing on a stream of uncompressed image data.
Figure 18B:
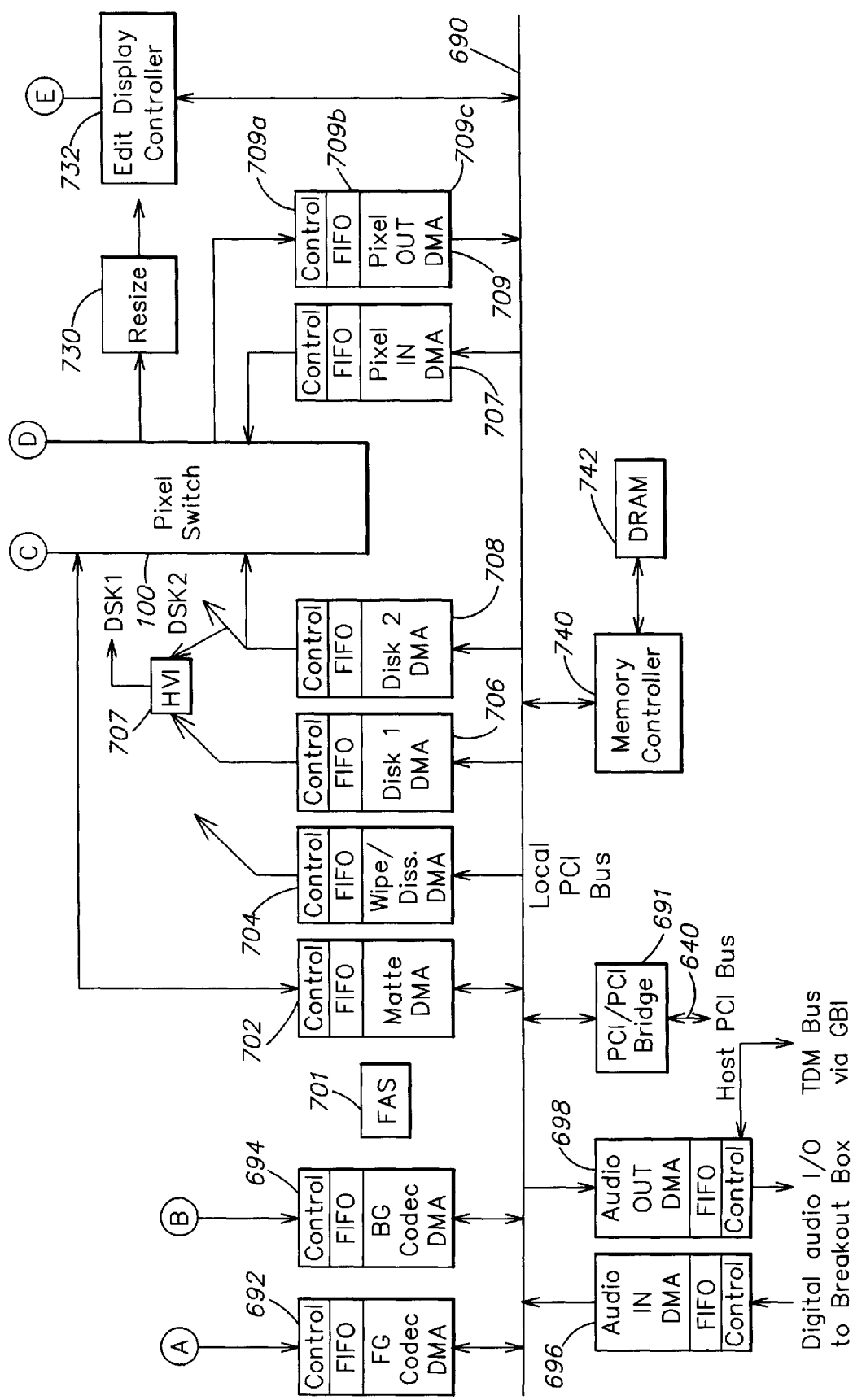

Referring now to FIG. 18, another embodiment of a video processing device 632 for processing uncompressed video is shown. In this embodiment, uncompressed data streams are passed directly to adjustment logic 674 and 684 for color correction, etc. No addition of marker codes or reordering of components is performed. Rather, the uncompressed data is played or rendered in the same format at which it is received.

The device 632 includes components similar to those described in FIGS. 3 and 14 for data management and flow control.

Accordingly, an architecture for performing real-time image processing on independent data streams using compressed or uncompressed imaging data has been described. Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A system for processing sequences of digital still images to provide digital video effects including:
    a first bidirectional processing datapath coupled to at least one configurable switch for transferring a first sequence of digital still images between the first bidirectional processing datapath and the at least one configurable switch;
    a second bidirectional processing datapath coupled to the at least one configurable switch for transferring a second sequence of digital still images between the second bidirectional processing datapath and the at least one configurable switch;
    wherein the at least one configurable switch selectively couples the first and second bidirectional processing datapaths to a plurality of destinations and a plurality of sources, wherein each of the plurality of modes of configuration of the at least one configurable switch controls a direction of flow of the sequences of digital still images between at least one of the first and second bidirectional and at least one of the plurality of destinations and plurality of sources;
    wherein one of the plurality of destinations includes outputs connected to inputs of a mixer, and wherein one of the plurality of sources is an input connected to an output of the mixer; and
    wherein one of the plurality of destinations includes at least one output connected to an input of a keyer, and wherein one of the plurality of sources is an input connected to an output of the keyer.

2. The system of claim 1, wherein one of the plurality of modes of configuration couples a first one of the bidirectional processing datapaths to both a first one of the plurality of destinations and to a second one of the plurality of destinations.

3. The system of claim 1, wherein one of the plurality of modes of configuration couples a first one of the bidirectional processing datapaths to a first one of the plurality of destinations and a second one of the bidirectional processing datapaths to a second one of the plurality of destinations.

4. The system according to claim 1, wherein a type of processing performed by each of the first and second bidirectional processing datapaths is determined in response to a direction of flow of the corresponding sequences of digital still images on the associated bidirectional processing datapath.

5. The system according to claim 4, wherein sequences of digital still images flow in a direction towards the switch in a process mode.

6. The system according to claim 4, wherein sequences of digital of still images flow in a direction away from the switch in a play back mode.

7. The system according to claim 1, wherein each of the first and second bidirectional processing data paths further include:

circuitry for compressing and decompressing the sequences of still images; and circuitry for adjusting the sequences of still images.

8. The system according to claim 7, wherein the circuitry for adjusting the sequences of digital still images includes circuitry for performing chroma, luma and gamma correction of the sequences of still images.

9. The system according to claim 8, wherein the circuitry for performing chroma, luma and gamma correction comprises a plurality of software accessible registers for selecting desired chroma, luma and gamma adjustments for the sequence of digital still images.

10. The system according to claim 7, wherein the circuitry for adjusting the sequences of digital still images includes circuitry for simulating motion effects in the sequences of digital still images.

11. The system according to claim 10, wherein the circuitry for providing motion effects includes:

a memory for storing the sequences of digital still images; and control bits for controlling the writing of the sequences of digital still images into the memory, wherein the memory locations for writing the sequences of digital still images are selected to simulate motion effects when the sequences of digital still images are forwarded out of the memory to a display.

12. The system according to claim 11, wherein the control bits include a hold bit for writing one component in the sequence of digital still images to multiple locations in the memory.

13. The system according to claim 11, wherein the memory is apportioned into an even portion and an odd portion, and wherein the sequences of digital still images are apportioned into a sequential plurality of fields, and wherein the writes of each of the sequential plurality of fields are interleaved between the even and odd portions of memory.

14. The system according to claim 13, where the control bits further include a suppress bit for precluding the interleaving of writes of the sequential plurality of fields between the even and odd portions of memory.

15. The system according to claim 13, wherein the control bits further include a swap bit for swapping an order of a pair of the sequential plurality of fields.

16. The system according to claim 7, wherein the sequences of digital still images at the source have a first format and the sequences of digital still images processed by the circuitry for adjusting have a second format, and wherein each of the first and second bidirectional processing datapaths further include circuitry for translating the sequences of digital still images from the first format to the second format, including circuitry for translating the sequences of digital still images from the second format to the first format.

17. The system according to claim 16, wherein the circuitry for translating further includes a static RAM device, and wherein translation is performed by writing the sequences of still images in the static RAM device in one of the first or second formats and reading the sequences of digital still images from the RAM device in the other one of the first or second formats.

18. The system according to claim 1, wherein each of the first and second bidirectional processing datapaths further include circuitry for resizing the sequences of digital still images.

19. The system of claim 1, wherein each of a subset of the plurality of sources is coupled to the configurable switch by a respective channel device.

20. The system of claim 19, wherein the at least one configurable switch is disposed on a video processing device coupled to a host computer by a bus and wherein each of the respective channel devices is provided to transfer sequences of digital still images between the at least one configurable switch on the video processing device and the host computer.

21. The system of claim 20, wherein each of the respective channel devices further includes:

circuitry for interfacing with the bus; and a storage device for temporary storage of sequences of digital still images transferred between the host computer and the configurable switch.

22. The system according to claim 21 wherein the circuitry for interfacing with the bus operates using direct memory access techniques.

23. The system according to claim 20, further including:

a storage device, coupled to the bus, for providing temporary storage of sequences of digital still image data transferred between the host computer and at least one of the respective channel devices.

24. The system according to claim 20, wherein at least one of the respective channels is reserved for storing uncompressed sequences of digital still images.

25. The system according to claim 1, wherein at least one of the plurality of sources is a digital input video source.

26. The system according to claim 25, wherein the at least one configurable switch is disposed on a video processing device coupled to a host computer, and wherein the digital input video source is received from a translator device coupled to a signal source.

27. The system according to claim 26, wherein the translator device is provided in an enclosure separate from the host computer.

28. The system according to claim 1, wherein the at least one configurable switch is disposed on a first video processing device, and wherein one of the inputs to the switch is received from a coupled video processing device.

29. The system according to claim 1, wherein a first one of the at least one configurable switches is disposed on a first video processing device, and a second one of the at least one configurable switches is disposed on a second video processing device, and wherein one of the plurality of destinations of the first switch is one of the plurality of sources of the second switch.

30. The system according to claim 1, wherein at least one of the plurality of sources forwards uncompressed sequences of digital still images to the at least one configurable switch.

31. The system according to claim 1, wherein each of the first and second bidirectional processing datapaths are independently configurable to transfer either compressed or uncompressed sequences of digital images between coupled sources and the at least one configurable switch.

32. The system according to claim 1, wherein the at least one configurable switch is disposed on a video processing device coupled to a host computer by a bus, and wherein each of a subset of the plurality of sources is coupled to the configurable switch by a respective channel device.

33. The system according to claim 32, claim wherein each of the first and second bidirectional processing datapaths are independently configurable to transfer either compressed or uncompressed sequences of digital images between coupled sources and the at least one configurable switch and wherein at least one of the respective channel devices is reserved for transferring uncompressed sequences of digital still images from the host computer to the configurable switch.

34. The system according to claim 33, further comprising a memory, coupled to the bus, for storage of uncompressed sequences of digital still images.

35. The system according to claim 1, wherein communication between the plurality of sources and the plurality of destinations is data flow controlled.

* * * * *